US010575696B2

(12) United States Patent
O'Brien et al.

(10) Patent No.: US 10,575,696 B2
(45) Date of Patent: Mar. 3, 2020

(54) AUTONOMOUS ROBOT AUTO-DOCKING AND ENERGY MANAGEMENT SYSTEMS AND METHODS

(71) Applicant: iRobot Corporation, Bedford, MA (US)

(72) Inventors: John P. O'Brien, Newton, MA (US); Vazgen Karapetyan, Pasadena, CA (US); William Morris, Wakefield, MA (US)

(73) Assignee: iRobot Corporation, Bedford, MA (US)

( * ) Notice: Subject to any disclaimer, the term of this patent is extended or adjusted under 35 U.S.C. 154(b) by 12 days.

(21) Appl. No.: 15/647,677

(22) Filed: Jul. 12, 2017

(65) Prior Publication Data

US 2018/0014709 A1 Jan. 18, 2018

Related U.S. Application Data

(60) Provisional application No. 62/361,881, filed on Jul. 13, 2016.

(51) Int. Cl.
*A47L 9/04* (2006.01)
*A47L 11/40* (2006.01)
(Continued)

(52) U.S. Cl.
CPC .......... *A47L 9/2873* (2013.01); *A47L 9/0477* (2013.01); *A47L 9/0488* (2013.01); *A47L 9/2826* (2013.01);
(Continued)

(58) Field of Classification Search
CPC ............. A47L 2201/02; A47L 2201/06; A47L 9/2826; A47L 9/2873; A47L 2201/022;
(Continued)

(56) References Cited

U.S. PATENT DOCUMENTS 881,339 A    3/1908  Povall
3,191,371 A *  6/1965  Brewer .................. A01D 34/63
                                                56/295
(Continued)

FOREIGN PATENT DOCUMENTS

CN         105259898      1/2016
WO    WO 2008-051027     5/2008

OTHER PUBLICATIONS

Chinese Office Action Corresponding to Chinese Patent Application No. 201720848424.2 (Foreign Text, 3 Pages, English Translation Thereof, 5 Pages) (dated Jul. 27, 2018).
(Continued)

*Primary Examiner* — Vuthe Siek
(74) *Attorney, Agent, or Firm* — Schwegman Lundberg & Woessner, P.A

(57) ABSTRACT

A method for docking an autonomous mobile floor cleaning robot with a charging dock, the robot including a receiver coil and a structured light sensor, the charging dock including a docking bay and a transmitter coil, includes: positioning the robot in a prescribed docked position in the docking bay using the structured light sensor and by sensing a magnetic field emanating from the transmitter coil; and thereafter induction charging the robot using the receiver coil and the transmitter coil with the robot in the docked position.

22 Claims, 14 Drawing Sheets

(51) Int. Cl.
*A47L 11/24* (2006.01)
*G05D 1/02* (2006.01)
*A47L 9/28* (2006.01)

(52) U.S. Cl.
CPC ............ *A47L 9/2884* (2013.01); *G05D 1/028* (2013.01); *G05D 1/0225* (2013.01); *G05D 1/0234* (2013.01); *A47L 2201/02* (2013.01); *A47L 2201/022* (2013.01); *A47L 2201/06* (2013.01); *G05D 2201/0203* (2013.01); *G05D 2201/0207* (2013.01)

(58) Field of Classification Search
CPC .... A47L 9/0477; A47L 9/0488; A47L 9/2884; A47L 9/28; A47L 9/04; A47L 11/40; A47L 11/24; G05D 2201/0207; G05D 1/0225; G05D 1/0234; G05D 1/028; G05D 2201/0203; G05D 1/02
See application file for complete search history.

(56) References Cited

U.S. PATENT DOCUMENTS

| | | | |
|---|---|---|---|
| 6,389,329 | B1 | 5/2002 | Colens |
| 6,532,404 | B2 | 3/2003 | Colens |
| 6,594,844 | B2 | 7/2003 | Jones |
| 6,690,134 | B1 | 2/2004 | Jones et al. |
| 6,781,338 | B2 | 8/2004 | Jones et al. |
| 6,809,490 | B2 | 10/2004 | Jones et al. |
| 6,965,209 | B2 | 11/2005 | Jones et al. |
| 7,155,308 | B2 | 12/2006 | Jones |
| 7,173,391 | B2 | 2/2007 | Jones et al. |
| 7,196,487 | B2 | 3/2007 | Jones et al. |
| 7,388,343 | B2 | 6/2008 | Jones et al. |
| 7,389,156 | B2 | 6/2008 | Ziegler et al. |
| 7,448,113 | B2 | 11/2008 | Jones et al. |
| 7,571,511 | B2 | 8/2009 | Jones et al. |
| 7,636,982 | B2 | 12/2009 | Jones et al. |
| 7,761,954 | B2 | 7/2010 | Ziegler et al. |
| 8,881,339 | B2 | 11/2014 | Gilbert, Jr. et al. |
| 9,178,370 | B2 | 11/2015 | Henricksen et al. |
| 9,215,957 | B2 | 12/2015 | Cohen et al. |
| 9,220,386 | B2 | 12/2015 | Gilbert, Jr. et al. |
| 2002/0016649 | A1 | 2/2002 | Jones |
| 2002/0120364 | A1 | 8/2002 | Colens |
| 2003/0025472 | A1 | 2/2003 | Jones et al. |
| 2003/0094922 | A1 | 5/2003 | Petersson et al. |
| 2004/0020000 | A1 | 2/2004 | Jones |
| 2004/0049877 | A1 | 3/2004 | Jones et al. |
| 2004/0158357 | A1* | 8/2004 | Lee ................. B60L 15/2036 700/258 |
| 2004/0187457 | A1 | 9/2004 | Colens |
| 2004/0207355 | A1 | 10/2004 | Jones et al. |
| 2005/0067994 | A1 | 3/2005 | Jones et al. |
| 2005/0150074 | A1 | 7/2005 | Diehl et al. |
| 2005/0204717 | A1 | 9/2005 | Colens |
| 2007/0266508 | A1 | 11/2007 | Jones et al. |
| 2008/0140255 | A1 | 6/2008 | Ziegler et al. |
| 2008/0155768 | A1 | 7/2008 | Ziegler et al. |
| 2008/0307590 | A1 | 12/2008 | Jones et al. |
| 2010/0049365 | A1 | 2/2010 | Jones et al. |
| 2010/0257690 | A1 | 10/2010 | Jones et al. |
| 2010/0257691 | A1 | 10/2010 | Jones et al. |
| 2010/0263158 | A1 | 10/2010 | Jones et al. |
| 2011/0241616 | A1* | 10/2011 | Kim ..................... H02J 7/025 320/108 |
| 2012/0169497 | A1* | 7/2012 | Schnittman ............. A47L 9/106 340/540 |
| 2012/0262109 | A1* | 10/2012 | Toya .................... H01M 10/44 320/108 |
| 2013/0093390 | A1 | 4/2013 | Partovi |
| 2013/0119929 | A1* | 5/2013 | Partovi ................. H02J 7/025 320/108 |
| 2016/0172104 | A1* | 6/2016 | Mirbozorgi ............ H02J 17/00 320/108 |

OTHER PUBLICATIONS

Notification of Transmittal of the International Search Report and the Written Opinion of the International Searching Authority, or the Declaration, in corresponding PCT Application No. PCT/US2017/041840 (19 pages) (dated Oct. 24, 2017).

* cited by examiner

AUTONOMOUS ROBOT AUTO-DOCKING AND ENERGY MANAGEMENT SYSTEMS AND METHODS

RELATED APPLICATION

This application claims priority to U.S. Provisional Application Ser. No. 62/361,881, filed Jul. 13, 2016, the contents of which are hereby incorporated by reference in its entirety.

FIELD

The present invention relates generally to robotic systems and, more specifically, to auto-docking and energy management systems for autonomous robots.

BACKGROUND

Automated robots and robotic devices are used to perform tasks traditionally considered mundane, time-consuming, or dangerous. As the programming technology increases, so too does the demand for robots that require a minimum of human interaction for tasks such as robot refueling, testing, and servicing. A goal is a robot that could be configured a single time, which would then operate autonomously, without need for human assistance or intervention.

SUMMARY OF THE INVENTION

According to embodiments of the invention, a method for docking an autonomous mobile floor cleaning robot with a charging dock, the robot including a receiver coil and a structured light sensor, the charging dock including a docking bay and a transmitter coil, includes: positioning the robot in a prescribed docked position in the docking bay using the structured light sensor and by sensing a magnetic field emanating from the transmitter coil; and thereafter induction charging the robot using the receiver coil and the transmitter coil with the robot in the docked position.

In some embodiments, the dock includes an upstanding backstop, and the method further includes aligning the mobile floor cleaning robot with the charging dock using the structured light sensor by detecting the backstop using the structured light sensor.

In some embodiments, when the robot is in the docked position, the receiver coil is located in a prescribed alignment with the transmitter coil.

In some embodiments, the method includes: executing a cleaning mission using the robot; and using the structured light sensor to detect obstacles and/or voids proximate the robot during the cleaning mission.

According to embodiments of the invention, an autonomous mobile floor cleaning robot for cleaning a surface includes a housing, a motive system, an induction charging system, and a cleaning system. The housing has a bottom. The motive system is operative to propel the robot across the surface. The induction charging system includes a receiver coil in the housing proximate the bottom of the housing, the receiver coil being configured to be inductively coupled to a transmitter coil in a charging dock during a charging operation. The cleaning system is operative to clean the surface as the robot traverses the surface. The cleaning system includes an evacuation port located in the bottom of the housing to release debris from the robot.

In some embodiments, the receiver coil is offset from the center of the robot.

According to embodiments of the invention, an autonomous mobile robot includes a housing, a motive system, and an induction charging system. The housing has a bottom. The motive system is operative to propel the robot across a surface. The induction charging system includes a receiver coil in the housing proximate the bottom of the housing. The housing includes a bottom wall separating the receiver coil from the surface.

In some embodiments, the robot further includes a cleaning system operative to clean the surface as the robot traverses the surface. In some embodiments, the receiver coil is sealed from the environment and the cleaning system by the housing.

In some embodiments, the robot further includes a cutting element suspended from the bottom of the housing.

In some embodiments, the housing defines a coil chamber configured to receive the receiver coil, the coil chamber positioned at the bottom of the housing, and the receiver coil is disposed in the coil chamber. In some embodiments, the receiver coil is substantially planar and the coil chamber holds the receiver coil horizontal above the surface. According to some embodiments, a nominal thickness of the portion of the bottom wall defining the coil chamber is at least 2 mm, and a nominal thickness of a top wall defining the coil chamber is at least 2 mm.

According to some embodiments, the housing includes a chassis and a bottom cover, the chassis includes a chassis bottom wall covering the receiver coil and separating the receiver coil from a compartment of the robot, and the bottom cover separates the receiver coil from the surface.

In some embodiments, a center axis of the receiver coil is horizontally offset from a lateral centerline extending between front and rear edges of the robot by an offset distance. According to some embodiments, the offset distance is in the range of from about 2 cm to 8 cm.

In some embodiments, the autonomous mobile robot further includes a debris bin disposed at least partially above the receiver coil.

According to some embodiments, the autonomous mobile robot further includes an evacuation port located in the bottom of the housing at a position horizontally offset from a lateral centerline extending between the front and rear edges of the robot and located adjacent the coil.

In some embodiments, the front of the robot defines a square profile.

In some embodiments, the receiver coil is located a vertical distance from a lower outer surface of the bottom wall in the range of from about 1 mm to 5 mm. According to some embodiments, the receiver coil is located a vertical distance from a lower outer surface of the bottom wall of less than about 3 mm.

According to some embodiments, windings of the receiver coil are mechanically fixed to an inside of a top surface of the bottom wall.

In some embodiments, the receiver coil is affixed to an inside top surface of the bottom wall by adhesive or fasteners.

According to some embodiments, the receiver coil is molded into the bottom wall or a top wall of the housing overlying the receiver coil.

In some embodiments, the receiver coil is encased by plastic on both its top and bottom sides.

Further features, advantages and details of the present invention will be appreciated by those of ordinary skill in the art from a reading of the figures and the detailed description of the embodiments that follow, such description being merely illustrative of the present invention.

BRIEF DESCRIPTIONS OF THE DRAWINGS

DETAILED DESCRIPTION OF EMBODIMENTS OF THE INVENTION

Figure 1:
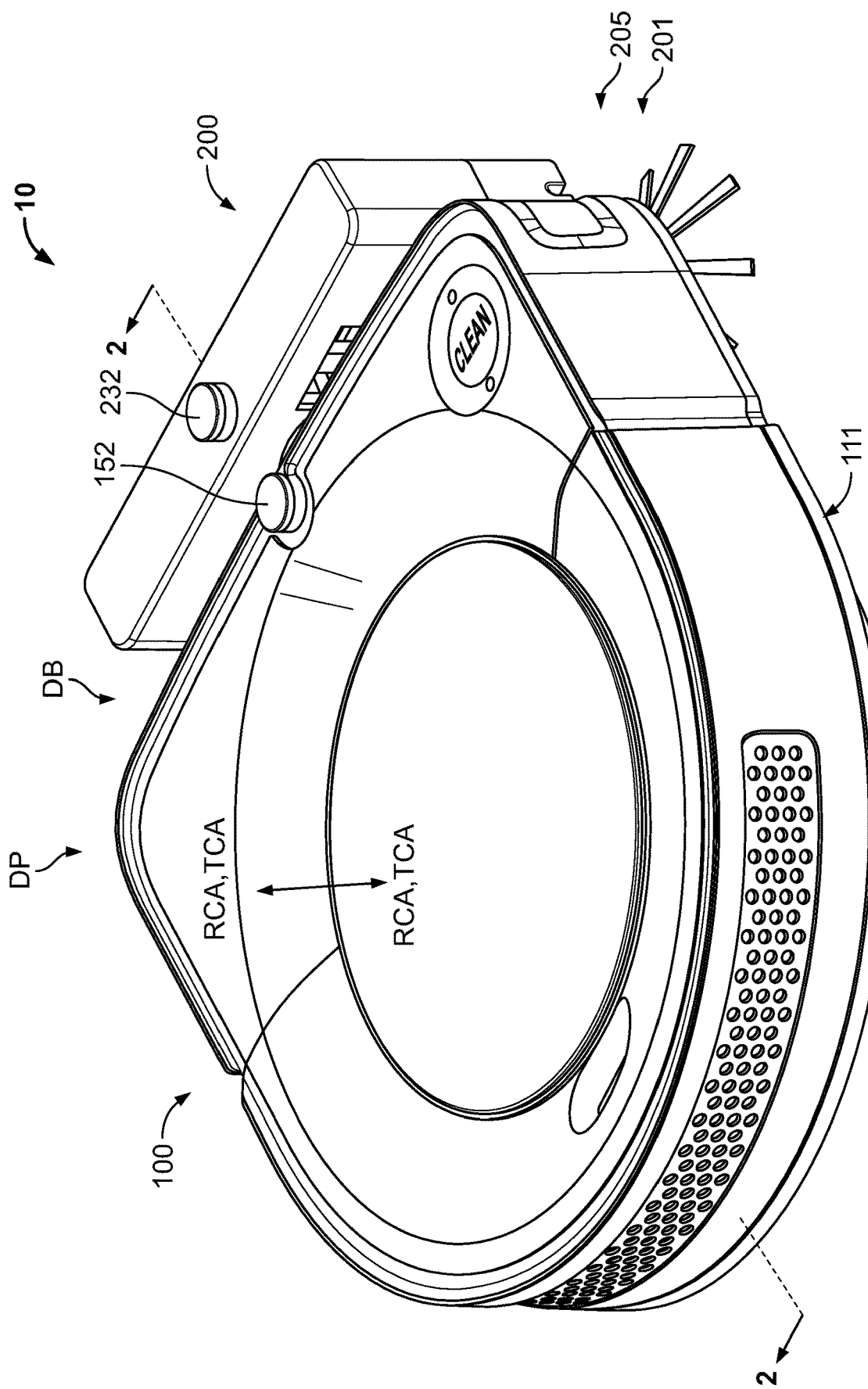
FIG. 1 is a top, rear perspective view of an autonomous coverage robot system according to embodiments of the invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein the expression "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The term "monolithic" means an object that is a single, unitary piece formed or composed of a material without joints or seams.

With reference to FIGS. 1-14, an autonomous coverage robot system 10 according to some embodiments is shown therein. The system 10 includes a vacuum cleaning robot 100 and a base station or dock 200. The system 10 may include an evacuation dock 300 (FIG. 13) in addition to or in place of the dock 200. The robot 100 is adapted to mate with the dock 200 and the evacuation dock 300.

The system 10 also includes a charging or energy management system 205 and an auto-docking control system 201 each including cooperatively operating components of the robot 100 and the dock 200. In some embodiments, the energy management system 205 includes an air gap transformer or induction charging circuit (including a primary or transmitter coil 244 in the dock 200 and a secondary or receiver coil 164 in the robot 100) to enable wireless charging of the robot 100 by the dock 200.

In the following description of the autonomous robot 100, use of the terminology "forward/fore" refers generally to the primary direction of motion of the robot 100, and the terminology fore-aft axis (see reference characters "FA" in FIG. 4) defines the forward direction of motion F (FIG. 4), which is coincident with the fore-aft diameter of the robot 100.

The robot 100 further defines a lateral or left-right axis LA and a vertical axis VA that are perpendicular to one another and to the axis FA. The axes FA and LA define a plane that is substantially parallel to the plane defined by the points of contact of the wheels 132 and caster 134 (described below) or the support surface (e.g., floor) on which the robot 100 rests.

Figure 8:
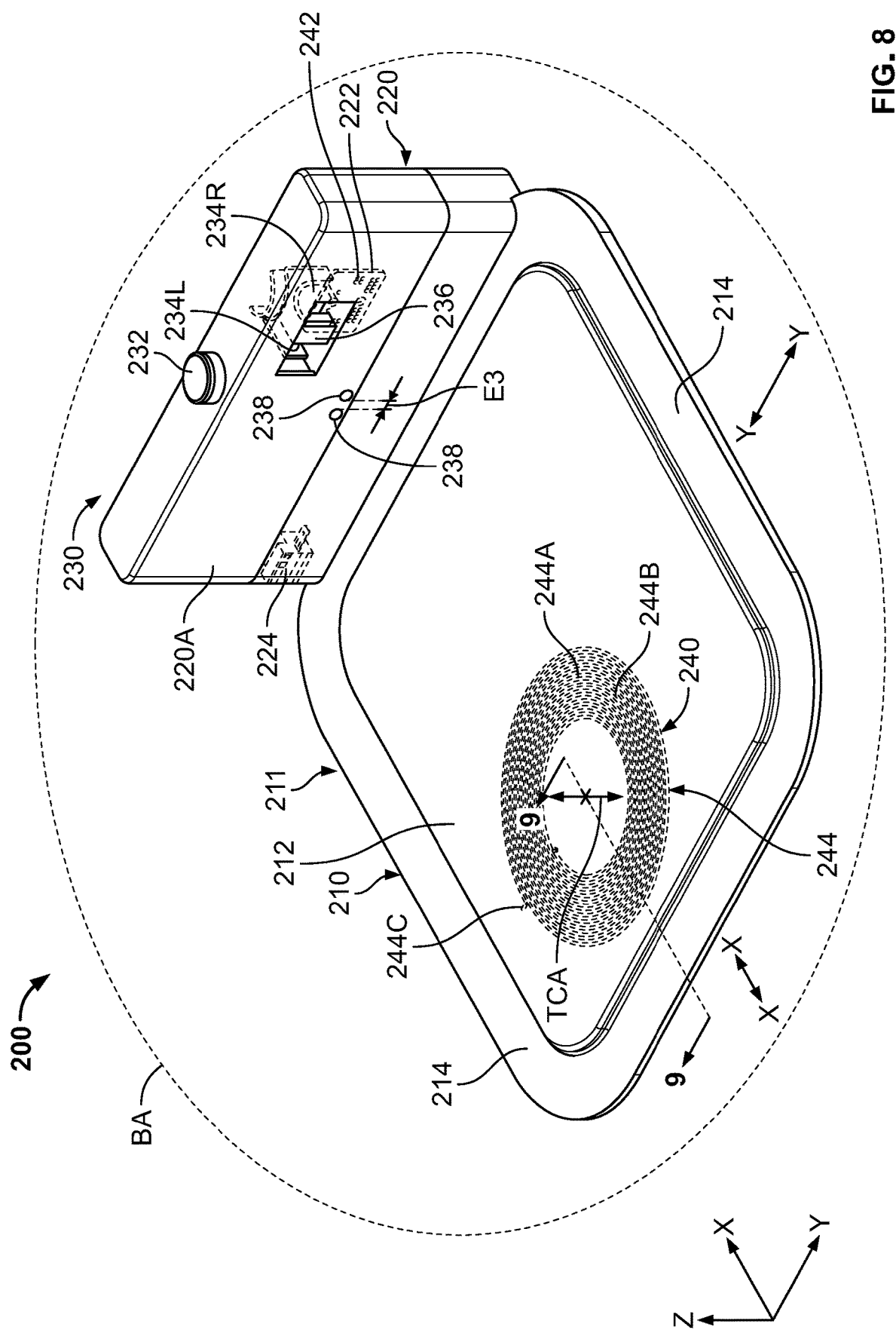
FIG. 8 is a front, top perspective view of a dock forming a part of the robot system of FIG. 1.

The description also uses a frame of reference based on the dock 200 including X-, Y- and Z-axes, which are depicted in FIG. 8. The X-, Y- and Z-axes are perpendicular to one another and intersect at the center of the dock 200. Movements, distances and dimensions along the Y-axis may be referred to as lateral, leftward or rightward. Movements, distances and dimensions along the X-axis may be referred to herein as depthwise, fore-aft, forward or rearward. Movements, distance and dimensions along the Z-axis may be referred to herein as vertical. The X- and Y-axes define a plane that is parallel to the support surface on which the dock 200 rests (e.g., a floor).

In the embodiment depicted, the robot 100 includes a robot controller 102, a body, housing infrastructure or housing (hereinafter, "housing") 111, an electrical energy storage battery 126, a motive system 130, a cleaning system 140, a detector system 150, and an energy management or charging subsystem 160. The detector system 150 forms a part of the auto-docking control system 201.

Figure 2:
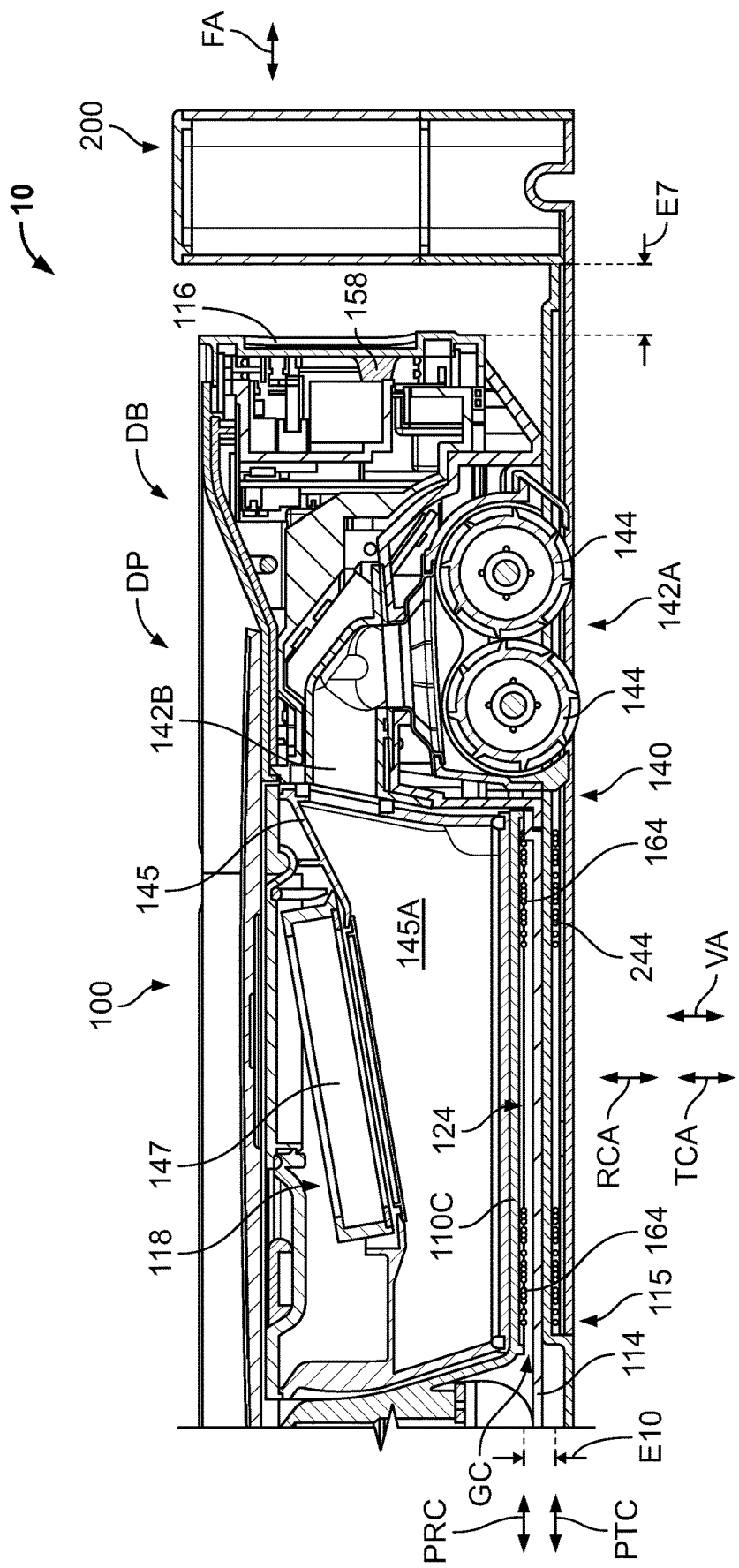
FIG. 2 is a cross-sectional view of the robot system of FIG. 1 taken along the line 2-2 of FIG. 1.

The housing 111 has an undercarriage 115 (FIG. 3) and defines an internal main chamber 118 (FIG. 2). The undercarriage 115 forms the underside or bottom side of the housing 111 and the robot 100. The housing 111 includes a chassis 110, a top cover 112, a bottom or undercarriage cover 114, and a displaceable bumper 116. The robot 100 may move in a forward direction F and a reverse drive direction R; consequently, the chassis 110 has corresponding forward and back ends, 110A and 110B, respectively.

The chassis 110 may be molded from a material such as plastic as a unitary or monolithic element that includes a plurality of preformed wells, recesses, and structural members for, inter alia, mounting or integrating elements of the various subsystems that operate the robot 100. The covers 112, 114 may be molded from a material such as a polymeric material (plastic) as respective unitary or monolithic elements that are complementary in configuration with the chassis 110 and provide protection of and access to elements and components mounted to the chassis 110. The chassis 110 and the covers 112, 114 are detachably integrated in combination by any suitable means (e.g., screws). In some embodiments and as shown, the housing 111 has a front end defining a square profile. In some embodiments, the chassis 110 and covers 112, 114 form a structural envelope of minimal height having a generally D-shaped configuration that is generally symmetrical along the fore-aft axis FA.

Figure 5:
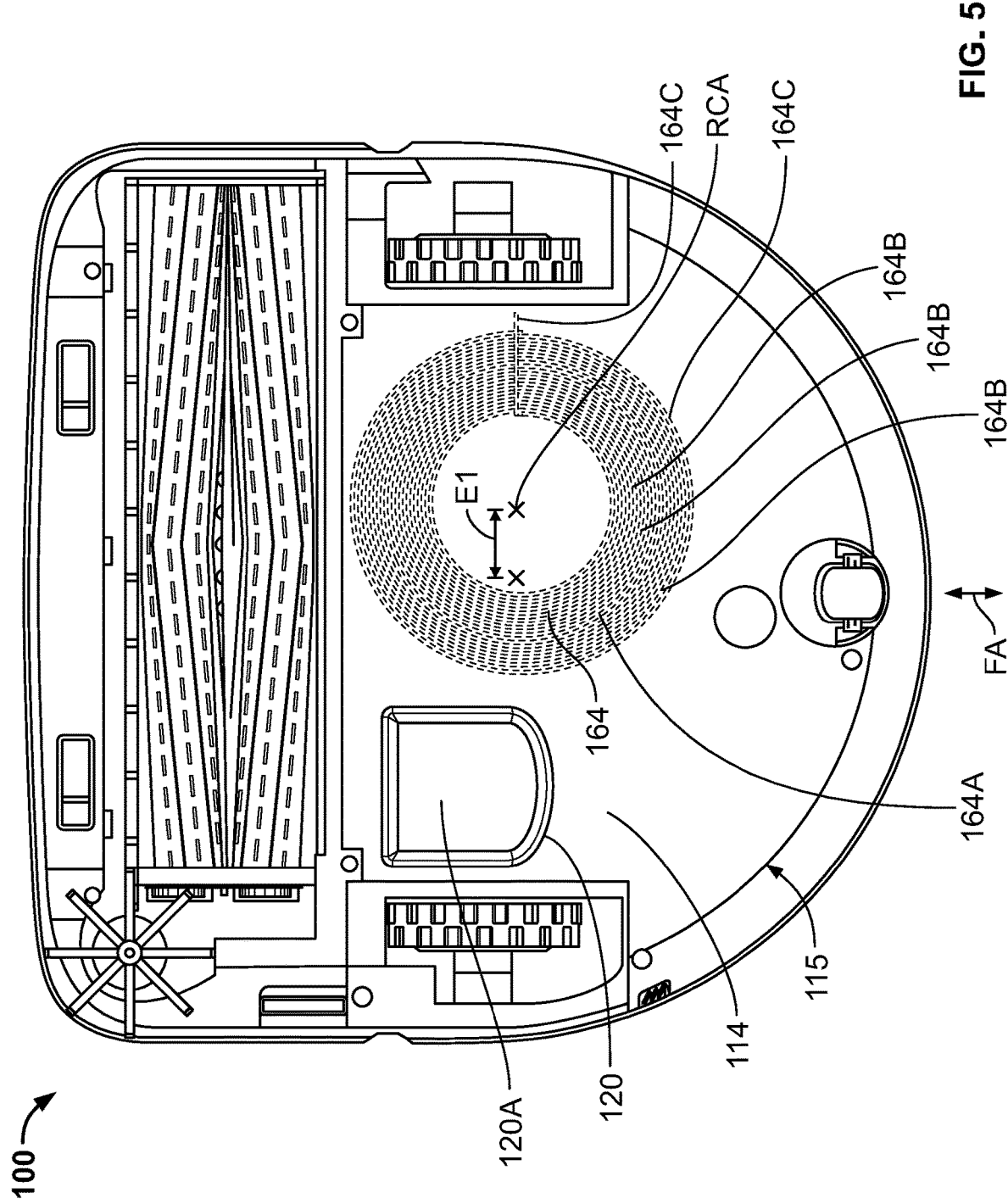
FIG. 5 is a bottom view of the robot of FIG. 3.

An evacuation port 120 is defined in the undercarriage cover 114 and the bottom wall 110C of the chassis 110. The evacuation port 120 may be provided with a closure device or flap 120A (FIG. 5).

Figure 3:
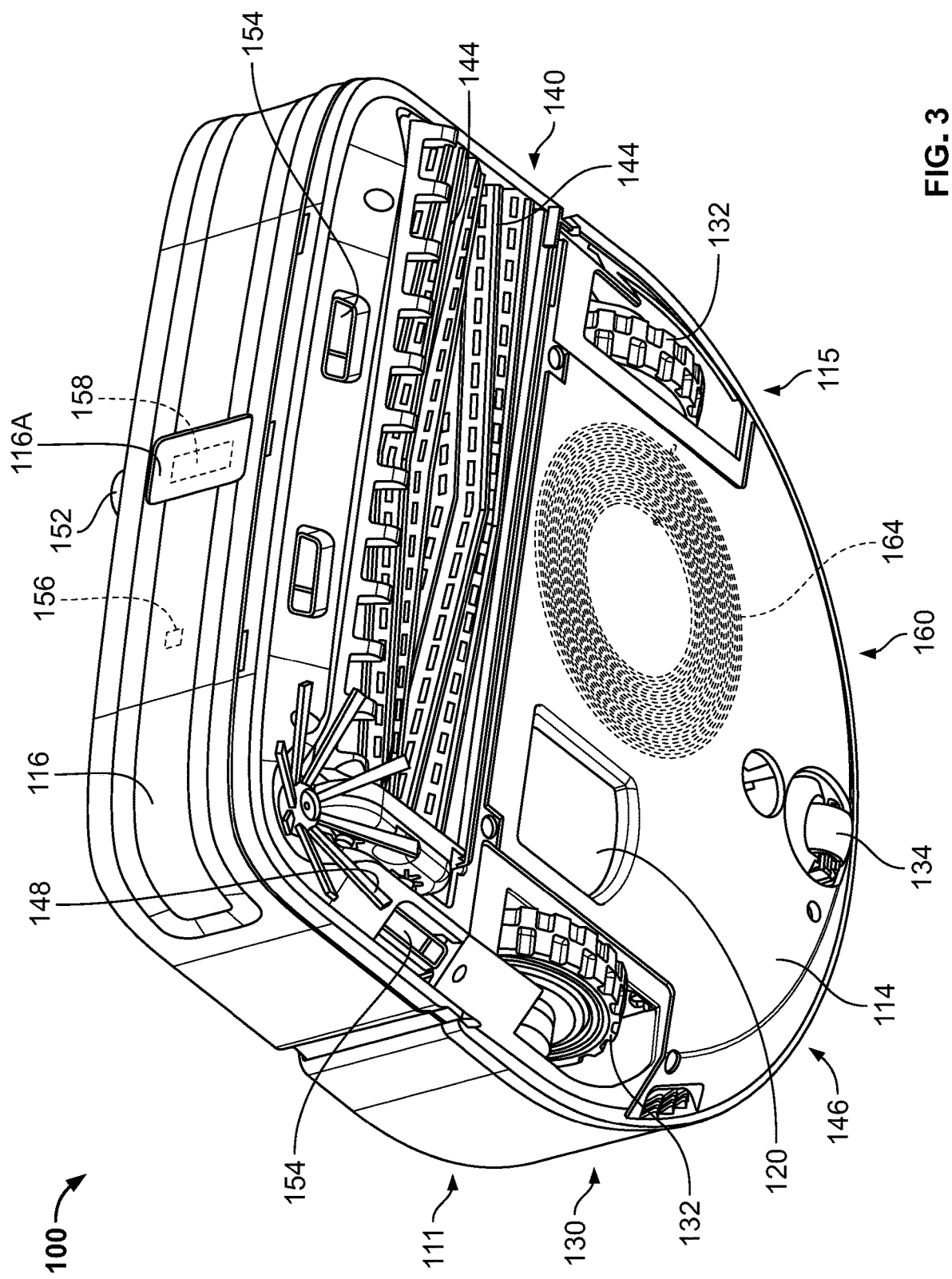
FIG. 3 is a front, bottom perspective view of a robot forming a part of the robot system of FIG. 1.
Figure 6:
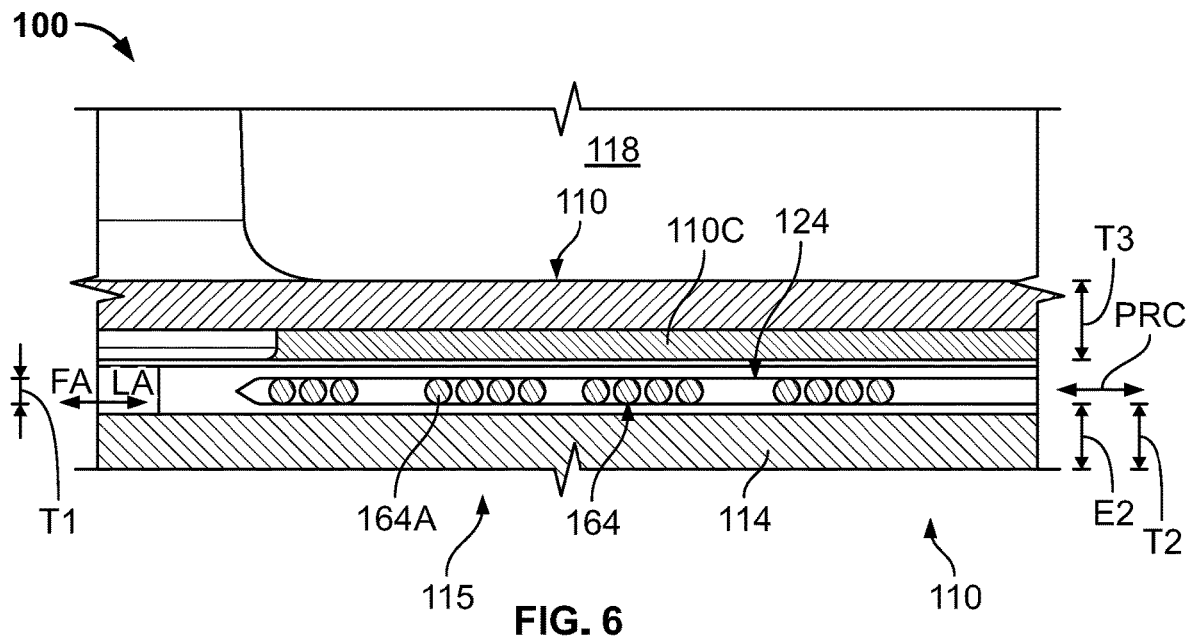
FIG. 6 is a fragmentary, cross-sectional view of the robot of FIG. 3 taken along the line 2-2 of FIG. 1.
Figure 7:
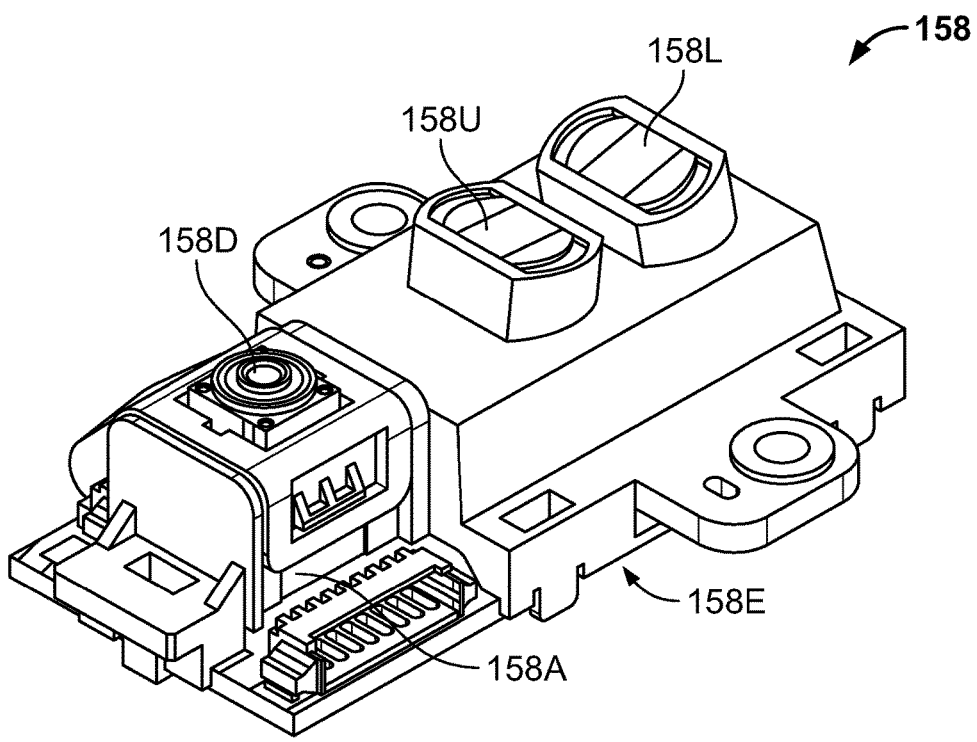
FIG. 7 is a front perspective view of an image sensing device forming a part of the robot of FIG. 3.

A coil chamber 124 is defined between the undercarriage cover 114 and the bottom wall 110C of the chassis 110 (FIGS. 3 and 6). The undercarriage cover 114 forms a bottom wall of the coil chamber 124, and the bottom wall 110C forms a top wall of the coil chamber 124.

The displaceable bumper 116 has a shape generally conforming to that of the front end of the chassis 110 and is mounted in movable combination at the forward portion of the chassis 110 to extend outwardly therefrom (the "normal operating position"). The mounting configuration of the displaceable bumper 116 is such that it is displaced towards the chassis 110 (from the normal operating position) whenever the bumper 116 encounters a stationary object or obstacle of predetermined mass (the "displaced position"), and returns to the normal operating position when contact with the stationary object or obstacle is terminated (due to operation of a control sequence which, in response to any such displacement of the bumper 116, implements a "bounce" mode that causes the robot 100 to evade the stationary object or obstacle and continue its task routine).

Installed along either lateral side of the chassis 110 are independent drive wheels 132 that mobilize the robot 100 and provide two points of contact with the floor surface. The drive wheels 132 may be spring loaded. The rear end 110B of the chassis 110 includes a non-driven, multi-directional caster wheel 134 that provides additional support for the robot 100 as a third point of contact with the floor surface. One or more electric drive motors 136 are disposed in the housing 111 and operative to independently drive the wheels 132. The motive components may include any combination of motors, wheels, drive shafts, or tracks as desired, based on cost or intended application of the robot 100.

In some embodiments, the cleaning system 140 includes a suction slot or opening 142A defined in the undercarriage 115. One or more motor driven rotating extractors (e.g., brushes or rollers) 144 flank the opening 142A. An electric vacuum fan 146 pulls air up through a gap between the extractors 144 to provide a suction force that assists the extractors in extracting debris from the floor surface. Air and debris that pass through the gap are routed through a plenum 142B that leads to an opening of a cleaning or debris bin 145 disposed or encased in the chamber 118. The opening leads to a debris collection cavity 145A of the debris bin 145. A filter 147 located above the cavity screens the debris from an air passage leading to the air intake of the vacuum fan 146. Filtered air exhausted from the vacuum fan 146 is directed through an exhaust port 122.

A side brush 148 is mounted along the sidewall of the chassis 110 proximate the forward end 110A and ahead of the extractors 144 in the forward drive direction F. The side brush 148 rotatable about an axis perpendicular to the floor surface. The side brush 148 allows the robot 100 to produce a wider coverage area for cleaning along the floor surface. In particular, the side brush 148 may flick debris from outside the area footprint of the robot 100 into the path of the centrally located cleaning head assembly.

Other suitable configurations for the vacuum cleaning system are disclosed in U.S. Pat. No. 9,215,957 to Cohen et al., U.S. Publication No. 2016/0166126 to Morin et al., and U.S. Pat. No. 8,881,339 to Gilbert, Jr. et al. the disclosures of which are incorporated herein by reference.

The robot controller circuit 102 (depicted schematically) is carried by the chassis 110. The robot controller 102 is configured (e.g., appropriately designed and programmed) to govern over various other components of the robot 100 (e.g., the extractors 144, the side brush 148, and/or the drive wheels 132). As one example, the robot controller 102 may provide commands to operate the drive wheels 132 in unison to maneuver the robot 100 forward or backward. As another example, the robot controller 102 may issue a command to operate one drive wheel 132 in a forward direction and the other drive wheel 132 in a rearward direction to execute a clock-wise turn. Similarly, the robot controller 102 may provide commands to initiate or cease operation of the rotating extractors 144 or the side brush 148. In some embodiments, the robot controller 102 is designed to implement a suitable behavior-based-robotics scheme to issue commands that cause the robot 100 to navigate and clean a floor surface in an autonomous fashion. The robot controller 102, as well as other components of the robot 100, may be powered by the battery 126 disposed on the chassis 110.

The detector system 150 (FIG. 4) includes a top or communications/guidance signal receiver or detector 152, proximity or wall following sensors 153, cliff sensors 154, a forward directional receiver or detector 156, an optical mouse sensor 157, a magnetic field sensor 155, an image sensing device 158, and a camera 159. In some embodiments, each of these sensors or detectors is communicatively coupled to the robot controller 102. The robot controller 102 implements the behavior-based-robotics scheme based on feedback received from the plurality of sensors distributed about the robot 100 and communicatively coupled to the robot controller 102.

The proximity sensors 153 (depicted schematically) are installed along the periphery of the robot 100 proximate the front corners of the robot 100. The proximity sensors 153 are responsive to the presence of potential obstacles that may appear in front of or beside the robot 100 as the robot 100 moves in the forward drive direction F.

The cliff sensors 154 are installed along the forward end 110A of the chassis 110. The cliff sensors 154 are designed to detect a potential cliff, or flooring drop, forward of the robot 100 as the robot 100 moves in the forward drive direction F. More specifically, the cliff sensors 154 are responsive to sudden changes in floor characteristics indicative of an edge or cliff of the floor surface (e.g., an edge of a stair).

The communications/guidance signal detector 152 is mounted on the top front of the housing 111 of the robot 100. The detector 152 is operable to receive signals projected from an emitter (e.g., the avoidance signal emitter 232 and/or the homing and alignment emitters 234R, 234L of the dock 200) and (optionally) an emitter of a navigation or virtual wall beacon. In some embodiments, the robot controller 102 may cause the robot 100 to navigate to and dock with the dock 200 in response to the communications detector 152 receiving a home signal emitted by the dock 200.

In some embodiments and as shown, the detector 152 is mounted at the highest point on the robot 100 and toward the front of the robot 100 as defined by the primary traveling direction, as indicated by an arrow on axis FA. In alternative embodiments, multiple detectors can be used in place of the top signal detector 152. Such an embodiment might include using multiple side-mounted sensors or detectors. Each of the sensors can be oriented in a manner so that a collective field of view of all the sensors corresponds to that of the single, top mounted sensor. Because a single, omni-directional detector is mounted at the highest point of the robot for optimal performance, it is possible to lower the profile of the robot by incorporating multiple, side mounted detectors.

The forward directional detector 156 is mounted on the front end of the robot 100 and may be mounted on or behind the bumper 116. The forward directional detector 156 receives signals projected from the emitters 234R, 234L on the dock 200. In other embodiments, a pair of detectors receive signals from the emitters 234R, 234L or more than two detectors may be used.

In some embodiments, the detectors 154, 156 are infrared ("IR") sensor or detector modules, that include a photodiode and related amplification and detection circuitry, in conjunction with an omni-directional lens, where omni-directional refers to a substantially single plane. Any detector, regardless of modulation or peak detection wavelength, can be used as long as the emitters 232, 234R, 234L on the base dock 200 are adapted to match the detectors 152, 156 on the robot 100. In another embodiment, IR phototransistors may be used with or without electronic amplification elements and may be connected directly to the analog inputs of a microprocessor. Signal processing may then be used to measure the intensity of IR light at the robot 100, which provides an estimate of the distance between the robot 100 and the source of IR light.

As discussed hereinbelow, in some embodiments, a magnetic field sensing detector 155 is used in place of or in addition to the communications signal detector 152 and/or the directional detector 156.

The camera 159 is a vision based sensor, such as a camera, having a field of view optical axis oriented in the forward drive direction of the robot 100. In the illustrated embodiment, the camera 159 is located at the rear end 110A of the robot with its line of sight angled forwardly and upwardly over the detector 152. In some embodiments, the camera 159 is a video camera. In some embodiments, the camera 159 is used for detecting features and landmarks in the operating environment and building a map using Video Simultaneous Localization and Mapping (VSLAM) technology.

Figure 4:
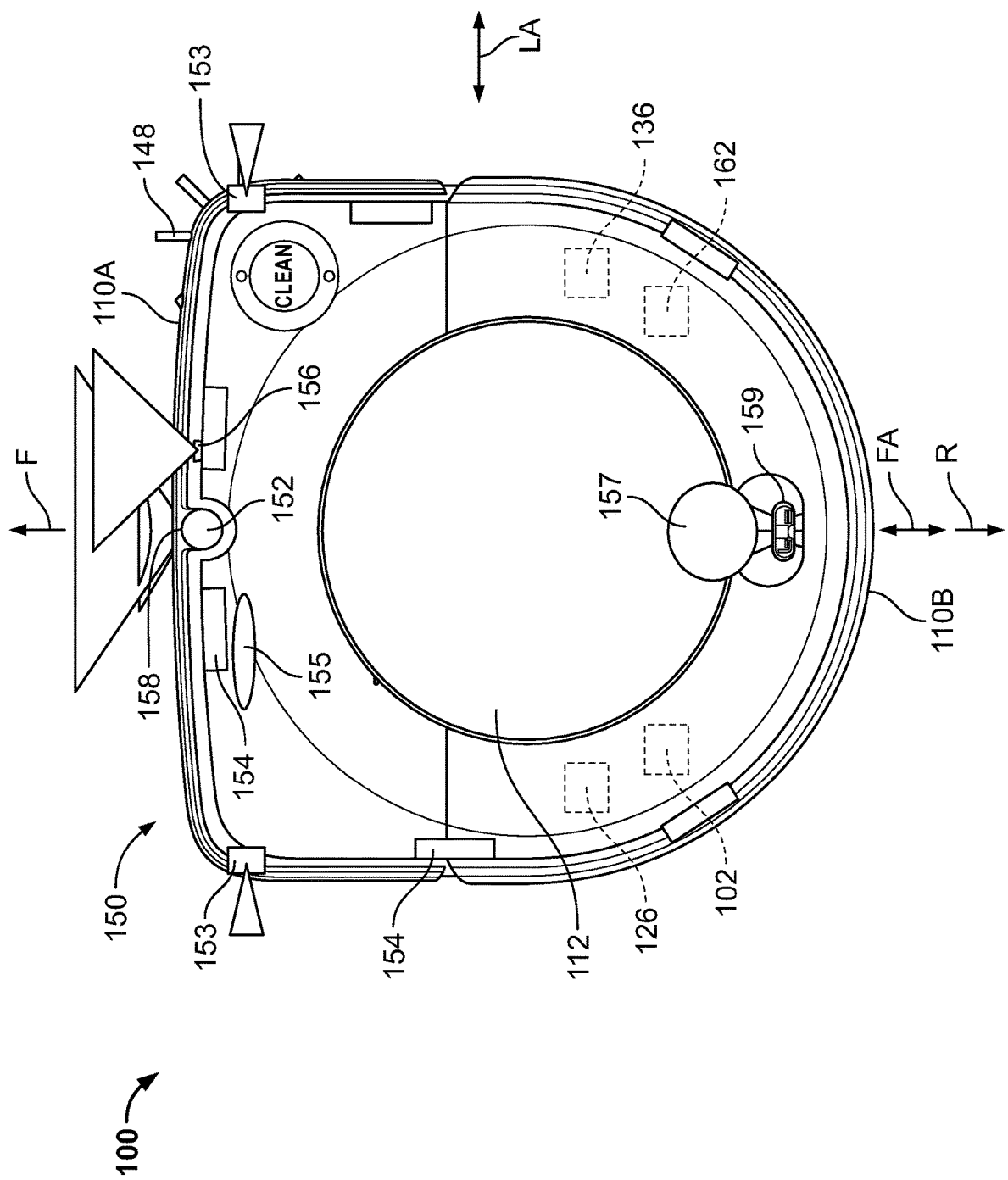
FIG. 4 is a top view of the robot of FIG. 3.

The optical mouse sensor 157 is located on the undercarriage 115 of the robot 100. The circle shown in the top view of FIG. 4 shows relative placement of the optical mouse sensor 157; however, the sensor 157 would not be visible in this view. The mouse sensor 157 tracks flooring and assists with drift compensation to keep the robot 100 moving in straight ranks.

The image sensing device 158 (FIG. 7) is mounted on the front end 110A of the robot 100. In some embodiments, the image sensor device 158 is mounted in or behind the bumper 116 and is protected by a transparent window 116A. In some embodiments, the image sensing device 158 is a structured light sensor.

The image sensing device 158 includes a processor 158A, a first light source 158L, a second light source 158U, and an image sensor 158D, all of which may be integrated into a unitary module 158E. The image sensor 158D may be a CCD image sensor, an active pixel sensor, a CMOS image sensor or other suitable image sensor or camera. The light sources 158L, 158U may each be an LED, laser diode, or other suitable light source.

In use, the light sources 158U, 158L project light onto respective target or working surfaces WSL, WSU (FIG. 11), which light is reflected from the working surfaces onto the image sensor 158D. The image sensor 158D acquires a plurality or series of image frames. The image frames are processed by the processor 158A to determine or calculate a depth, distance and/or displacement of the image sensor device 158 from or relative to each working surface WSL, WSU.

In some embodiments and as shown, the light source 158L is configured to project its structured light beam BL (FIG. 11) at a downward oblique angle (relative to horizontal) to intersect a lower working surface WSL, and the light source 158U is configured to project its structured light beam BU at an upward oblique angle (relative to horizontal) to intersect an upper working surface WSU. In operation, the lower surface WSL will typically be a floor or other support surface along which the robot 100 traverses, and the upper surface WSU may be objects in the environment of the robot 100 located above the floor or other support surface. In some embodiments, the image sensing device 158 determines the distance to each work surface based on the vertical location on the image sensor 158D at which the beam BU or BL reflected off the working surface intersects the image sensor 158D in the detection window of the image sensor 158D.

Suitable structured light image sensing devices for use as the image sensing device 158 may include the Global Shutter Image Sensor available from PixArt Imaging, Inc. of Taiwan.

Various other types of sensors, though not shown in the illustrated examples, may also be incorporated in the robot 100 without departing from the scope of the present disclosure. For example, a tactile sensor responsive to a collision of the bumper 116 and/or a brush-motor sensor responsive to motor current of the brush motor may be incorporated in the robot 100.

The robot 100 may further include a bin detection system for sensing an amount of debris present in the cleaning bin 122 (e.g., as described in U.S. Patent Publication 2012/0291809, the entirety of which is hereby incorporated by reference).

The robot charging subsystem 160 includes a charging circuit 162 that includes a secondary or receiver coil 164. The robot charging subsystem 160 forms a part of the energy management system 205.

In some embodiments, the receiver coil 164 includes a wire 164A that is concentrically, spirally wound to form radially superimposed segments or turns 164B, and input and output ends 164C. In some embodiments, the coil 164 is substantially planar or flat.

According to some embodiments, the coil 164 has a thickness T1 (FIG. 6) of less than 1.25 mm and, in some embodiments, in the range of from about 0.2 mm to 1.5 mm.

The receiver coil 164 is mounted in the undercarriage 115 of the robot 100, under the bin 145. As shown in FIG. 6, the receiver coil 164 is contained or encased in the coil chamber 124. In some embodiments, the coil 164 is secured to the housing 111 in the coil chamber 124. In some embodiments, the windings of the coil are mechanically fixed to the inside (top) surface of the cover 114. The coil 164 may be affixed to the cover 114 and/or the bottom wall 110C of the chassis 110 by adhesive or fasteners, for example. In some embodiments, the coil 164 is molded into the cover 114 and/or the bottom wall 110C. In some embodiments, the coil 164 is molded in plastic so that it is encased by plastic (e.g., the cover 114) on both its top and bottom sides (i.e., fully encased).

In some embodiments, the coil chamber 124 is closed or sealed off from the environment exterior of the robot 100 and from the main chamber 118. In some embodiments, the coil chamber 124 is substantially hermetically sealed off from the environment exterior of the robot 100 and from the main chamber 118. In this way, the coil 164 is isolated from the environment and the remainder of the robot 100. The coil 164 is thereby protected from contamination by dust or debris around the robot or present within the robot 100.

The receiver coil 164 is located in the undercarriage 115 at a location corresponding to the location of the transmitter coil 244 of the dock 200. Generally, the receiver coil 164 on the robot 100 mirrors the transmitter coil 244 on the dock 200. According to some embodiments and as shown in FIG. 5, the center axis RCA of the coil 164 is horizontally offset from the lateral centerline FA of the robot 100 in order to provide room for the evacuation port 120. In some embodiments, the offset distance E1 (FIG. 5) between the axes RCA and FA (i.e., the fore-aft midline of the robot 100) is in the range of from about 2 cm to 8 cm.

In some embodiments, at least a portion of the debris bin is disposed above the receiver coil 164. By locating the coil 164 at a location horizontally offset from the lateral centerline FA, room is provided on the undercarriage of the robot 100 to locate the evacuation port 120 laterally outside the outer diameter of the receiver coil 164. As a result, the conduit or flow path from the debris bin 145 to the evacuation port 120 is located outside of the receiver coil 164 and not through the opening of the receiver coil 164 or through the coil chamber 124.

In some embodiments, the coil 164 is oriented substantially parallel to the FA-LA plane of the robot 100.

According to some embodiments, the receiver coil 164 is located a vertical distance E2 (FIG. 6) from the lower outer surface of the bottom cover 114 of less than about 3 mm and, in some embodiments, in the range of from about 1 mm to 5 mm.

According to some embodiments, the nominal thickness T2 (FIG. 6) of the portion of the bottom cover 114 defining the coil chamber 124 is at least 2 mm. According to some embodiments, the nominal thickness T3 (FIG. 6) of the portion of the chassis bottom wall 110C defining the coil chamber 124 (i.e., the top wall defining the coil chamber 124) is at least 2 mm.

Further details of embodiments of the receiver coil 164 and the robot charging subsystem 160 are provided hereinbelow.

The robot 100 may be modified to perform any suitable task(s). For example, the robot 100 may be used for floor waxing and polishing, floor scrubbing, ice resurfacing (as typically performed by equipment manufactured under the brand name Zamboni®), sweeping and vacuuming, unfinished floor sanding and stain/paint application, ice melting and snow removal, grass cutting, etc. In some embodiments, the robot is configured as a mobility base carrying a retractable mast on which a camera is mounted. Any number of components may be required for such tasks, and may each be incorporated into the robot 100, as necessary. For simplicity, this application will describe vacuuming as the demonstrative predetermined task. The energy management and auto-docking functions disclosed herein have wide application across a variety of robotic systems.

FIG. 8 is a schematic perspective view a dock 200 in accordance with one embodiment of the invention. The dock 200 includes a housing 211 including both a substantially horizontal base plate or platform 210 and a substantially vertical tower or backstop 220. A docking bay DB is defined over the platform 210 and in front of the backstop 220. The dock 200 may be any of a variety of shapes or sizes, providing sufficient space for the desired components and systems, described below.

The platform 210 includes a coil chamber 216 (FIG. 9) defined therein. A raised pad wall 212 overlies the coil chamber 216. Tracks 214 are defined on either lateral side of the coil chamber 216 and pad wall 212.

The platform 210 is generally parallel to the ground surface on which the dock 200 rests or may be slightly ramped to provide space for wiring. The height or thickness of the platform 210 can be sized to accommodate a transmitter induction coil 244.

The dock 200 includes a dock charging subsystem 240, a communications/guidance system 230, a dock controller 222, and a power input connector 224 (connected to a power supply, not shown). The dock charging system 240 forms a part of the energy management system 205.

The dock controller circuit 222 (depicted schematically) is carried by the housing 211. The dock controller 222 is configured (e.g., appropriately designed and programmed) to govern over various other components of the dock 200.

The communications/guidance system 230 (FIG. 8) includes a top signal emitter 232, a first or right front homing/alignment emitter 234R, a second or left front homing/alignment emitter 234L, and a pair of horizontally spaced apart fine alignment emitters 238.

The top signal emitter 232 is mounted on the top of the backstop 220. The emitter 232 generates a first signal, such as an avoidance signal BA (FIG. 8), in a diffuse region near the dock 200 to prevent the robot from coming into inadvertent direct contact with the dock 200 while performing a task, such as vacuuming. The top signal emitter 232 may utilize a parabolic reflector to transmit the avoidance signal.

In such an embodiment, the avoidance signal is emitted by a single LED directed at a lens whose geometry is determined by rotating a parabola about its focus. This parabolic reflector thus projects the avoidance signal BA out in a 360° pattern, without the necessity of multiple emitters. A similar configuration can be employed in the detector 156 on the robot, with a single receiver used in place of the single LED.

The homing/alignment emitters 234R, 234L are located on a front wall 220A of the backstop 220. In some embodiments, the emitters 234R, 234L are separated by a baffle 236. The homing/alignment emitters 234R and 234L emit or project respective homing signals BR and BQ (FIG. 10) as discussed below. In some embodiments, the emitters 234R, 234L are LEDs. The emitters 234R, 234L serve as navigational buoys or fiducials. In some embodiments and as shown, the emitters 234R, 234L are laterally offset from the centerline X-X of the dock 200 and the directional detector 156B is offset from the centerline FA of the robot 100 so that the detector 156B is substantially centered between the emitters 234R, 234L when the robot 100 is in the docked position.

The fine alignment emitters 238 are located on the front wall 220A. The fine alignment emitters 238 are spaced apart a prescribed distance E3 (FIG. 8). In some embodiments, the distance E3 is in the range of from about 1 cm to 3 cm. The fine alignment emitters 238 emit or project respective near alignment signals BN as discussed below. In some embodiments, the fine alignment emitters 238 are LEDs. The emitters 238 serve as navigational beacons or fiducials.

The dock charging subsystem 240 includes a charging circuit 242, which includes a primary or transmitter coil 244.

In some embodiments, the transmitter coil 244 includes a wire 244A that is concentrically, spirally wound to form radially superimposed segments or turns 244B, and input and output ends 244C. In some embodiments, the coil 244 is substantially planar or flat.

According to some embodiments, the coil 244 has a thickness T4 (FIG. 9) of less than 1.25 mm and, in some embodiments, in the range of from about 0.2 mm to 1.5 mm.

Figure 9:
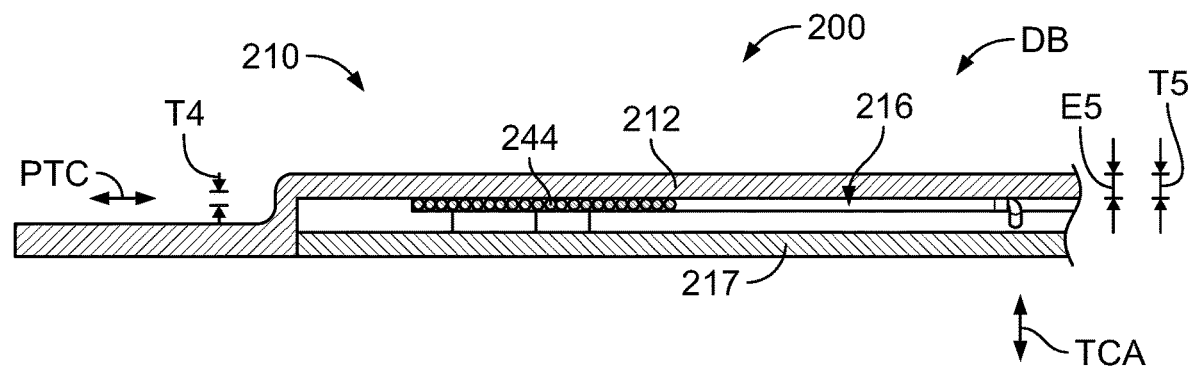
FIG. 9 is a fragmentary, cross-sectional view of the dock of FIG. 8 taken along the line 9-9 of FIG. 8.

The transmitter coil 244 is mounted in the platform 210 of the dock 200. In some embodiments and as shown in FIG. 9, the transmitter coil 244 is contained in the coil chamber 216. In some embodiments, the coil 244 is secured to the platform 210 in the coil chamber 216. The coil 244 may be affixed to the pad wall 212 and/or a bottom wall 210A of the platform 210 by adhesive or fasteners, for example. In some embodiments, the coil 244 is molded into the pad wall 212 and/or the bottom wall 217.

In some embodiments, the coil chamber 216 is closed or sealed off from the environment exterior of the dock 200. In some embodiments, the coil chamber 216 is substantially hermetically sealed off from the environment exterior of the dock 200. In this way, the coil 244 is isolated from the environment and protected from contamination by the robot 100.

The transmitter coil 244 is located in the platform 210 in a location corresponding to the location of the receiver coil 164 of the robot 100.

In some embodiments, the coil 244 is oriented substantially parallel to the floor.

According to some embodiments, the transmitter coil 244 is located a vertical distance E5 (FIG. 9) from the upper outer surface of the pad wall 212 of less than about 7 mm and, in some embodiments, in the range of from about 3 mm to 20 mm.

According to some embodiments, the nominal thickness T5 (FIG. 9) of the portion of the pad wall 212 defining the coil chamber 216 is at least 2 mm.

Further details of embodiments of the transmitter coil 244 and the dock charging subsystem 240 are provided hereinbelow.

The robot 100 uses a variety of behavioral modes to effectively vacuum a working area. Behavioral modes are layers of control systems that can be operated in parallel. The robot controller 102 (e.g., microprocessor) is operative to execute a prioritized arbitration scheme to identify and implement one or more dominant behavioral modes for any given scenario, based upon inputs from the sensor system. The robot controller 102 is also operative to coordinate avoidance, homing, and docking maneuvers with the dock 200.

Generally, the behavioral modes for the described robot 100 can be characterized as: (1) coverage behavioral modes; (2) escape behavioral modes, and (3) safety behavioral modes. Coverage behavioral modes are primarily designed to allow the robot 100 to perform its operations in an efficient and effective manner, while the escape and safety behavioral modes are priority behavioral modes implemented when a signal from the sensor system indicates that normal operation of the robot 100 is impaired (e.g., obstacle encountered), or is likely to be impaired (e.g., drop-off detected).

Representative and illustrative coverage behavioral modes (for vacuuming) for the robot 100 include: (1) a Spot Coverage pattern; (2) an Obstacle-Following (or Edge-Cleaning) Coverage pattern, and (3) a Room Coverage pattern. The Spot Coverage pattern causes the robot 100 to clean a limited area within the defined working area, e.g., a high-traffic area. In a certain embodiments the Spot Coverage pattern is implemented by means of a spiral algorithm (but other types of self-bounded area algorithms, such as polygonal, can be used). The spiral algorithm, which causes outward or inward spiraling movement of the robot 100, is implemented by control signals from the microprocessor to the motive system to change the turn radius/radii thereof as a function of time or distance traveled (thereby increasing/decreasing the spiral movement pattern of the robot 100).

The foregoing description of typical behavioral modes for the robot 100 are intended to be representative of the types of operating modes that can be implemented by the robot 100. One skilled in the art will appreciate that the behavioral modes described above can be implemented in other combinations and other modes can be defined to achieve a desired result in a particular application.

A navigational control system may be used advantageously in combination with the robot 100 to enhance the cleaning efficiency thereof, by adding a deterministic component (in the form of a control signal that controls the movement of the robot 100) to the motion algorithms, including random motion, autonomously implemented by the robot 100. The navigational control system operates under the direction of a navigation control algorithm. The navigation control algorithm includes a definition of a predetermined triggering event.

Broadly described, the navigational control system, under the direction of the navigation control algorithm, monitors the movement activity of the robot 100. In one embodiment, the monitored movement activity is defined in terms of the "position history" of the robot 100, as described in further detail below. In another embodiment, the monitored movement activity is defined in terms of the "instantaneous position" of the robot 100.

The predetermined triggering event is a specific occurrence or condition in the movement activity of the robot 100. Upon the realization of the predetermined triggering event, the navigational control system operates to generate and communicate a control signal to the robot 100. In response to the control signal, the robot 100 operates to implement or execute a conduct prescribed by the control signal, i.e., the prescribed conduct. This prescribed conduct represents a deterministic component of the movement activity of the robot 100.

The image sensing device 158 can be used to acquire information for guidance and operation of the robot during various operations of the robot 100. In some embodiments, the image sensing device 158 is used to detect obstacles and hazards about the robot 100 so that those obstacles and hazards can be avoided or otherwise addressed. Within the operational range of the image sensor device 158, the downwardly directed beam BL can be used to detect obstacles at or near the floor level as well as cliffs or depressions in the floor. The upwardly directed beam BU can be used to detect obstacles at or above the top of the robot 100 in order to detect and avoid obstacles under which the robot may become wedged.

In some embodiments, the image sensing device 158 is operative to effectively detect objects and voids up to at least 10 inches forward of the robot 100 and, in some embodiments, up to at least 12 inches.

The camera 159 can be used to navigate the robot and acquire images for other operational use. In some embodiments, the camera 159 is a VSLAM camera and is used to detect features and landmarks in the operating environment and build a map.

Figure 10:
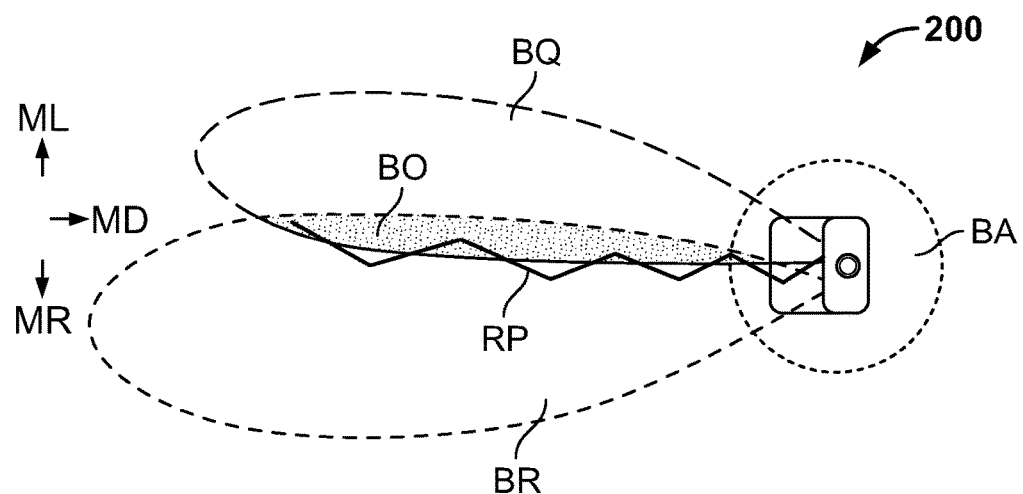
FIGS. 10 and 11 are schematic diagrams illustrating operations of a communications/guidance system forming a part of the robot system of FIG. 1.

While the robot 100 is vacuuming, it will periodically approach the stationary dock 100. Contact with the dock 200 could damage or move the dock 100 into an area that would make docking impossible. Therefore, avoidance functionality is desirable. To avoid inadvertent contact, the dock 200 may generate an avoidance signal BA, as depicted in FIG. 10. The avoidance signal BA is shown being transmitted from the emitter 232 on the top of the backstop 220. The radial range of the avoidance signal BA from the dock 200 may vary, depending on predefined factory settings, user settings, or other considerations. At a minimum, the avoidance signal BA need only project a distance sufficient to protect the dock 200 from unintentional contact with the robot 100. The avoidance signal BA range can extend from beyond the periphery of the dock 200, to up to and beyond several feet from the dock 200, depending on the application.

The avoidance signal BA may be an omni-directional (i.e., single plane) infrared beam, although other signals are contemplated, such as a plurality of single stationary beams or signals. If stationary beams are used, however, a sufficient number could provide adequate coverage around the dock 200 to increase the chances of the robot 100 encountering them. When the detector 152 of the robot 100 receives the avoidance signal BA from the emitter 232, the robot 100 can alter its course, as required, to avoid the dock 200. Alternatively, if the robot 100 is actively or passively seeking the dock 200 (for recharging or other docking purposes), it can alter its course toward the dock 200, such as by circling the dock 200, in such a way to increase the chances of encountering the homing signals as described below.

Generally, the avoidance signal BA is modulated and coded, as are the homing signals BR, BQ. The bit encoding method as well as binary codes are selected such that the robot 100 can detect the presence of each signal, even if the robot 100 receives multiple codes simultaneously.

Whenever measurable level of IR radiation from the avoidance signal BA strikes the detector 152, the robot's IR avoidance behavior is triggered. In one embodiment, this behavior causes the robot 100 to spin in place to the left until the IR signal falls below detectable levels. The robot 100 then resumes its previous motion. In one embodiment, the detector 152 acts as a gradient detector. When the robot 100 encounters a region of higher IR intensity, the robot 100 spins in place. Because the detector 152 is mounted at the front of the robot 100 and because the robot 100 does not move backward, the detector 152 always "sees" the increasing IR intensity before other parts of the robot 100. Thus, spinning in place causes the detector 152 to move to a region of decreased intensity. When the robot 100 next moves forward, it necessarily moves to a region of decreased IR intensity—away from the avoidance signal BA.

In other embodiments, the dock 200 includes multiple coded emitters at different power levels or emitters that vary their power level using a system of time multiplexing. These create concentric coded signal rings which enable the robot 100 to navigate towards the dock 200 from far away in the room. Thus, the robot 100 would be aware of the presence of the dock 200 at all times, facilitating locating the dock 200, docking, determining how much of the room has been cleaned, etc. Alternatively, the robot 100 uses its motion through the IR field to measure a gradient of IR energy. When the sign of the gradient is negative (i.e., the detected energy is decreasing with motion), the robot 100 goes straight (away from the IR source). When the sign of the gradient is positive (energy increasing), the robot 100 turns. The net effect is to implement a "gradient descent algorithm," with the robot 100 escaping from the source of the avoidance signal BA. This gradient method may also be used to seek the source of emitted signals. The concentric rings at varying power levels facilitate this possibility even without a means for determination of the raw signal strength.

In some embodiments, in order to dock, the system 10 executes a docking procedure including the following sequential steps: a) a seeking or discovery step; b) a homing or far approach step; and c) a near approach step. In some embodiments, the system 10 may also execute a fine approach step. The robot 100 may adopt corresponding modes in which it executes each of these steps (i.e., a seeking mode, a far approach mode, a near approach mode, and a fine approach mode). The docking procedure terminates with the robot 100 in a final, prescribed docked position DP (FIG. 1) within the docking bay DB. The docked position DP may include permitted tolerances or deviation from a precise target docked position.

In the seeking step, the robot 100 in the seeking mode seeks and discovers the presence and general location of the dock 200 with respect to the robot 100.

Then, in the far approach step, the robot 100 in the far approach mode coarse or gross aligns with the docking bay DB of the dock 200 and progressively moves toward the docked position DP. The robot 100 may progress toward the dock 200 through an intermediate distance, after which the near approach step and mode take over.

Then, in the near approach step, the robot 100 in the near approach mode more closely aligns with the docking bay DB and further progressively moves toward the docked position DP. In this step, the robot 100 reduces the distance between the front end 110A of the robot 100 and the front wall 220A of the backstop 220. The robot 100 may also adjust its lateral alignment or rotational orientation with respect to the platform 210. In some embodiments, the robot 100 may turn and drive rearwardly into the docking bay DB (i.e., dock backwards).

Then, in the fine approach step, the robot 100 in the fine approach mode further progressively moves toward the target docked position and may terminate the approach upon reaching the docked position DP. In this step, the robot 100 fine tunes the distance between the front end 110A of the robot 100 and the front wall 220A of the backstop 220. The robot 100 may also fine tune its lateral alignment or rotational orientation with respect to the platform 210.

In some embodiments, the robot 100 performs its docking with the dock 200 accurately and repeatably, without the need for gross mechanical guidance features.

The robot 100 may assume its seeking mode and seek the dock 200 when it detects the need to recharge its battery, or when it has completed vacuuming the room. As described above, once the robot 100 detects or discovers the presence of the avoidance signal BA (and therefore the dock 200), which in this mode serves as a discovery signal, it can assume the far approach mode and move as required to detect the homing signals BR, BL.

In the far approach step, the robot 100 uses the homing signals BR, BQ (FIG. 10) and its directional detector 156 to guide the robot 100. As with the avoidance signal BA above, the projected range and orientation of the homing signals BR, BQ may be varied, as desired. It should be noted however, that longer signals can increase the chance of the robot 100 finding the dock 200 efficiently. Longer signals can also be useful if the robot 100 is deployed in a particularly large room, where locating the dock 200 randomly could be inordinately time consuming. Homing signal BR, BQ ranges that extend from approximately six inches beyond the front of the platform 210, to up to and beyond several feet beyond the platform 210 are contemplated, depending on application. The angular width of the homing signals BR, BQ may vary depending on application, but angular widths in the range of 5° to up to and beyond 60° are contemplated. The angular width of each homing signal BR, BQ may be the area covered by the beam or sweep of the homing signal BR, BQ and, in some embodiments, is generally or substantially frusto-conical. A gradient behavior as described above can also be used to aid the robot in seeking out the dock 200.

The two homing signals BR, BQ are distinguishable by the robot 100, for example as a first or lateral right homing signal BR and a second or lateral left homing signal BQ. IR beams are generally used to produce the signals and, as such, are not visible. The IR beams may be modulated. Any signal bit pattern may be used, provided the robot 100 recognizes which signal to orient to a particular side. Alternatively, the signals BR, BQ may be distinguished by using different wavelengths or by using different carrier frequencies (e.g., 380 kHz versus 38 kHz, etc.).

Thus, when the robot 100 wants or needs to dock, if the detector 156 receives the right signal BR transmitting from the dock 200, it moves to keep the right signal BR on the robot's right side; if it detects the left signal BQ transmitting from the dock 200, it moves to keep the left signal BQ on the robot's left side. Where the two signals overlap (the overlap zone BO), the robot 100 knows that the dock 200 is nearby and may then dock. Such a system may be optimized to make the overlap zone BO as thin as practicably possible, to ensure proper orientation and approach of the robot 100 and successful docking. Alternatively, the right signal BR and left signal BQ may be replaced by a single signal, which the robot 100 would follow until docked.

FIG. 10 depicts an exemplary path RP the robot 100 may traverse during a docking procedure utilizing the homing signals. When the detector 156 is in the left signal 156 field, the robot 100 will move towards the right, in direction MR in an effort to keep that left signal BQ to the left of the robot 100. When the detector 156 is in the right signal BR field, thus the robot 100 will move towards the left, in direction ML in an effort to keep that right signal BR to the right of the detector 156. Last, when the detector 156 encounters the overlap zone BO, the robot 100 will move in direction MD directly towards the dock 100.

While approaching the dock 200, the robot 100 may slow its speed of approach and/or discontinue vacuuming, or perform other functions to ensure trouble-free docking. These operations may occur when the robot 100 detects the avoidance signal BA, thus recognizing that it is close to the dock 200, or at some other predetermined time, e.g., upon a change in the signal from the emitters 234R, 234L.

Figure 11:
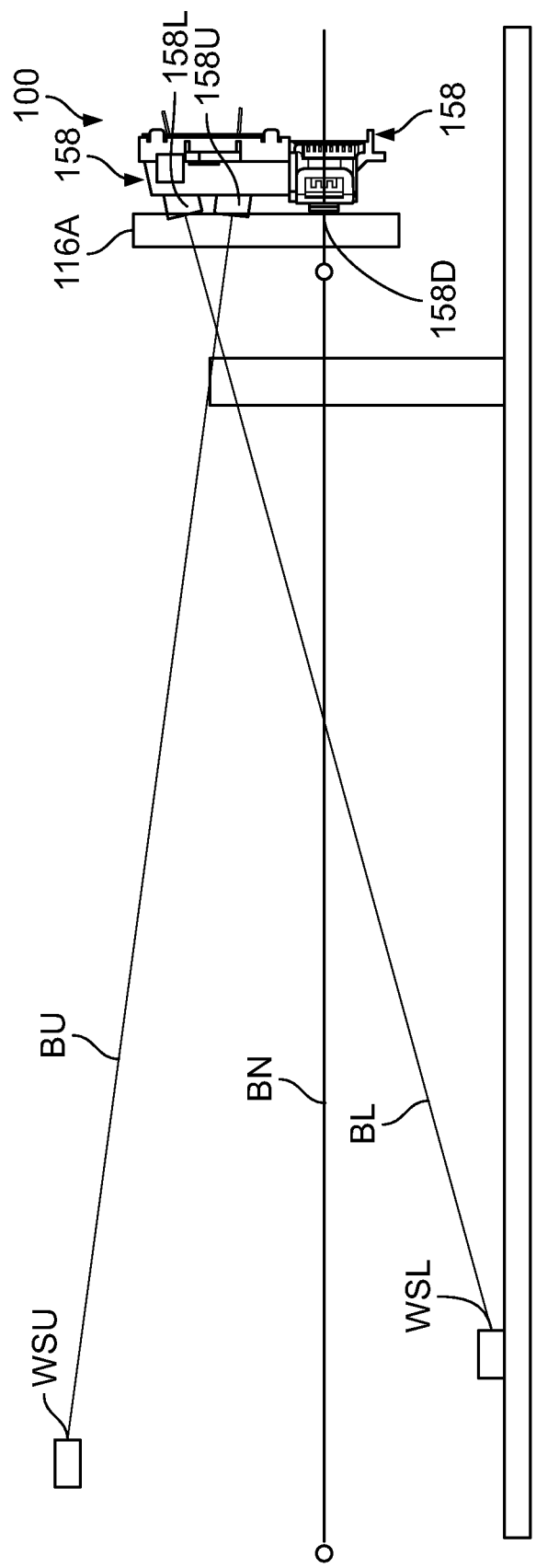

With reference to FIG. 11, in the near approach mode, the robot 100 uses the image sensor device 158 to guide the robot 100 in the near approach step. Data from the image sensor device 158 can be used to guide both lateral alignment of the robot 100 with respect to the backstop 220 and depth alignment (i.e., proximity) of the robot 100 with respect to the backstop 200 (i.e., the image sensor device 158 operates as a depth or distance detector). The image sensor device 158 uses the structured light beams BL, BU to detect the presence and relative location of the dock 200 relative to the front end 110A of the robot 100. In some embodiments, the image sensor device 158 detects the location of the backstop front wall 220A as the robot 100 enters the docking bay DB.

The image sensor device 158 can thus gauge the distance between the front end 110A of the robot 100 and the backstop 220 and thereby the position of the robot 100 relative to the dock 200 on the X-axis. The robot controller 102 can then use this information to control movement of the robot 100.

In some embodiments, the near approach mode is assumed before the wheels 132 engage the tracks 214. In some embodiments, the near approach mode is assumed when the robot 100 is in the range of from about 8 to 16 inches from the backstop 220.

In some embodiments, the robot controller 102 will use the image sensor device 158 alone to determine the final position of the robot 100. However, the desired docked position DP may be such that the spacing E7 (FIG. 2) between the front wall 220A and the image sensor 158D is less than the specified or effective minimum range E8 (FIG. 11) of the image sensor device 158 (i.e., the image sensor device 158 is too close to the front wall 220A to accurately determine the distance). For example, the minimum range E8 of the image sensor device 158 may be 3 cm and the spacing E7 may be less than 5 mm. For this reason, the robot 100 may further execute a fine approach step. The fine approach step may be accomplished using different techniques/devices, as discussed below.

In some embodiments, in the fine approach step, the robot 100 uses the image sensor device 158 and the fine alignment emitters 238 to guide the robot 100 into its final docked position. The emitters 238 are spaced apart a known distance E3 from one another. The modulated signal beams BN (FIG. 11) emitted from the emitters 238 are received directly at the image sensor 158B. As the robot 100 approaches the backstop wall 220A, the perceived distance between the emitters 238 shrinks, and when the perceived distance equals an expected value for the desired spacing E7 of the robot 100 to the backstop wall 220A, the robot 100 halts. From this, the image sensor device 158 can determine the distance to the backstop wall 220A with sufficient accuracy within a range less than the effective minimum range of the image sensor device 158 (using structural light sensing).

If the effective minimum range provided by this method is insufficient to guide the robot 100 to the final position, the robot controller 102 can guide the robot 100 the remaining distance to the docked position DP using odometry or dead reckoning. That is, the robot 100 uses the image sensor 158D and emitters 238 to guide the robot 100 to a distance within the effective minimum range, calculates the gap distance from the detected position to the docked position DP, and then drives the robot 100 forward the gap distance.

In other embodiments, in the fine approach step, the robot 100 uses odometry or dead reckoning as described above without using the emitters 238. That is, the robot 100 uses the image sensor device 158 to guide the robot 100 to a distance within the effective minimum range of the image sensor device 158, calculates the gap distance from the detected position to the docked position DP, and then drives the robot 100 forward the gap distance.

In another embodiment, the robot 100 uses the magnetic coils 164, 244 to dock. By sensing the magnetic field of the dock side coil 244 upon approaching the dock 200, the robot 100 can determine alignment of the dock side transmit coil 244 and robot side receiver coil 164.

In other embodiments, in the fine approach step, the robot 100 uses an onboard bump sensor (e.g., a contact sensor or displacement sensor) to detect when the front end 110A of the robot 100 has made contact with the front wall 220A. Upon detecting contact, the robot 100 may stop or reverse a prescribed distance to position the robot 100 in the docked position DP.

In other embodiments, the camera 159 (e.g., a VSLAM camera) is used to detect the dock 200 in order to guide the robot 100 in the far approach step. The camera 159 may also be used to build and use a map using VSLAM technology as discussed above. For example, in some embodiments, the camera 159 is aimed upward (e.g., to view locations 3-8 feet above the floor) to view objects or features (e.g., picture frames and doorway frames and edges) for mapping and localizing the robot 100 relative to these landmarks (i.e., groupings of features).

In addition to operating as navigational beacons, homing signals BR, BQ, the avoidance signal BA, and/or the image sensor signals BL, BU may also be used to transmit information, including programming data, fail safe and diagnostic information, docking control data and information, maintenance and control sequences, etc. In such an embodiment, the signals can provide the control information, dictating the robot's reactions, as opposed to the robot 100 taking certain actions upon contacting certain signals from the dock 200. In that case, the robot 100 functions as more of a slave to the dock 200, operating as directed by the signals sent.

In each of the far approach step, the near approach step, and the fine approach step, the robot 100 may use the navigational aids described herein to adjust the lateral alignment of the robot 100 with respect to the dock 200, the angular orientation of the robot 100 with respect to the dock 200, and/or the depthwise position of the robot 100 into the dock 200 (i.e., proximity to the backstop 220).

Generally, the control sequence for vacuuming can include three subsequences based on the measured energy level of the robot 100. Those are referenced generally as a high energy level, a medium energy level, and a low energy level. In the high energy level subsequence, the robot 100 performs its predetermined task, in this case, vacuuming (utilizing various behavioral modes as described above), while avoiding the dock 200. When avoiding the dock 200, the robot 100 performs its avoidance behavior and continues to operate normally. This process continues while the robot 100 continually monitors its energy level. Various methods are available to monitor the energy level of the power source, such as coulometry (i.e., the measuring of current constantly entering and leaving the power source), or simply measuring voltage remaining in the power source. Other embodiments of the robot 100 may simply employ a timer and a look-up table stored in memory to determine how long the robot 100 can operate before it enters a different energy level subsequence. Still other embodiments may simply operate the robot 100 for a predetermined time period before recharging, without determining which energy level subsequence it is operating in. If the robot 100 operates on a liquid or gaseous fuel, this level may also be measured with devices currently known in the art.

Once the energy remaining drops below a predetermined high level, the robot 100 enters its medium energy level sequence. The robot 100 continues to vacuum and monitor its energy level. In the medium energy level, however, the robot 100 "passively seeks" the dock 200. While passively seeking the dock 200, the robot 100 does not alter its travel characteristics; rather, it continues about its normal behavioral mode until it detects the avoidance signal BA or a homing signal BR, BQ, each of which may be followed until the robot 100 ultimately docks with the dock 200. In other words, if the robot detects the avoidance signal BA while passively seeking, rather than avoiding the dock 200 as it normally would, it alters its travel characteristics until it detects the homing signal BR or BQ, thus allowing it to dock.

Alternatively, the robot 100 continues operating in this medium energy level subsequence until it registers an energy level below a predetermined low level. At this point, the robot 100 enters the low level subsequence, characterized by a change in operation and travel characteristics. To conserve energy, the robot 100 may discontinue powering all incidental systems, and operations, such as vacuuming, allowing it to conserve as much energy as possible for "actively searching" for the dock 200. While actively searching, the robot 100 may alter its travel characteristics to increase its chances of finding the dock 200. It may discontinue behavioral modes such as those employing a spiral movement, which do not necessarily create a higher chance of locating the dock 200, in favor of more deliberate modes, such as wall-following. This deliberate seeking will continue until the robot 100 detects the presence of the dock 200, either by detecting the avoidance signal BA or the homing signals BR, BQ. Clearly, additional subsequences may be incorporated which sound alarms when the power remaining reaches a critical level, or which reconstruct the route the robot 100 has taken since last contacting the dock 200 to aid in relocating the dock 200.

The robot 100 may also dock because it has determined that it has completed its assigned task (e.g., vacuuming a room) or its bin needs to be emptied. The robot 100 may make this determination based on a variety of factors, including considerations regarding room size, total run time, total distance traveled, dirt sensing, etc. Alternatively, the robot may employ room-mapping programs, using the dock 200 and/or walls and large objects as points of reference. Upon determining that it has completed its task, the robot 100 will alter its travel characteristics in order to find the dock 200 quickly. The dock 200 may include a charging system only (i.e., a charging dock) or may include both a charging system and an evacuation system or station operative to empty debris from the bin of the robot 100.

Once the robot 100 is in the docked position, it can recharge itself autonomously. Circuitry within the dock 200 detects the presence of the robot 100 and then switches on the charging voltage to the transmitter coil 244.

While docked with the dock 200, the robot 100 can also perform other maintenance or diagnostic checks. In certain embodiments, the robot 100 can completely recharge its power source or only partially charge it, based on various factors. Other behaviors while in the docking position such as diagnostic functions, internal mechanism cleaning, communication with network, or data manipulation functions may also be performed.

As discussed, herein, the energy management system 205 uses electromagnetic induction charging to charge the robot 100. The use of induction charging can provide a number of advantages as compared to direct electrical contact charging.

The use of induction charging eliminates electrical contacts as points of failure in the system 10. The induction charging system makes docking easier and more reliable.

Greater flexibility is provided for industrial design. Induction charging allows for a completely sealed dock.

As discussed herein, in some embodiments the magnetic field from the transmitter coil can be used as a dock avoidance signal to the robot, in which case the dock avoidance sensor of the robot can be omitted.

The induction charging system does not require explicit communication from the charge receiving circuit (on the robot) to the charge transmitter circuit (on the dock) for staying in regulation.

By encasing the receiver coil 164 and the transmitter coil 244 in the coil chambers 124 and 216 (and, likewise encasing the transmitter coil 344 in the coil chamber 316 as described below), the coils 164, 244, 344 are isolated from the environment and the interior of the robot 100. As a result, people and pets and internal components of the robot 100 are protected from the voltage of the coils and the coils are protected from damage. Additionally, the transmitter coils 244, 344 are prevented from contacting the receiver coil 164. In some embodiments, each coil 164, 244, 344 is encased on each of its top and bottom sides by plastic having a thickness in the range of from about 1 to 3 mm.

Various parameters may affect the coupling factor between the receiver and transmitter coils and can be adjusted to improve the coupling factor. The coupling factor is increased by a smaller separation gap, larger coil areas, and more precise alignment. Good alignment is less critical for larger coils. Thicker coil wire improves efficiency.

In some embodiments, the coils are operated at frequencies in the 160-270 kHz range.

Figure 12:
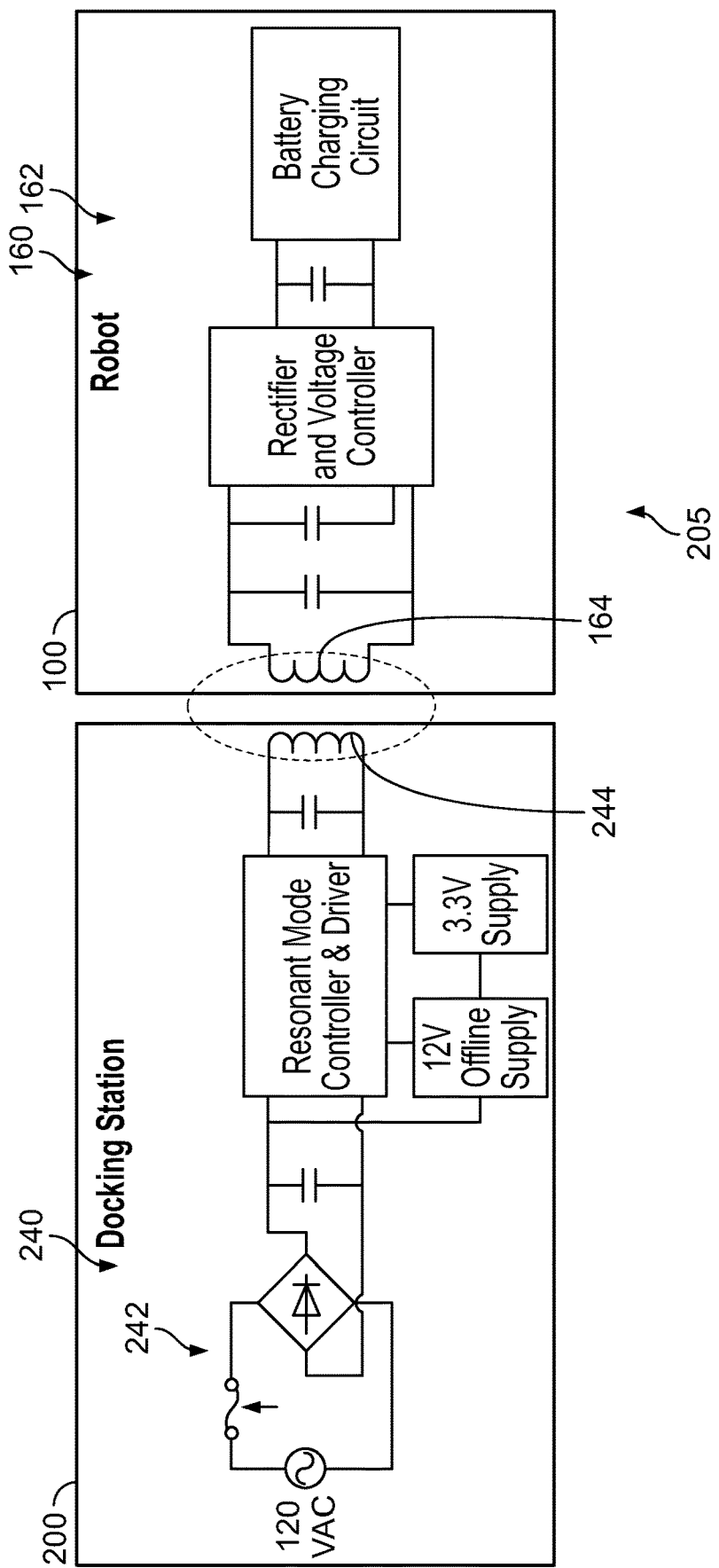
FIG. 12 is a schematic diagram representing electrical circuits forming parts of the robot system of FIG. 1.

The electromagnetic induction charging system 205 is schematically shown in FIG. 12 and includes the robot charging subsystem 160 and the dock charging subsystem 240. When the robot 100 is docked in the docking bay DB as described, the receiver coil 164 is superimposed over the transmitter coil 244 with a vertical or axial gap GC therebetween. In this manner, the coils 164, 244 form an air gap transformer. The circuit 242 applies an alternating current through the transmitter coil 244, thereby creating an alternating magnetic field (flux) emanating from the transmitter coil 244. The flux is received and converted into an electrical current by the receiver coil 164. This electrical current is used by the circuit 162 to charge the battery 126 or otherwise provide energy to the robot 100.

The efficiency of the induction charging (both energy transfer rate and power loss) is dependent on the alignment and spacing between the coils 164, 244. The docking modes, methods, structures and sensors as described herein can ensure that the robot 100 is consistently properly docked in the docked position DP, and the coils 164, 244 are thereby properly aligned.

In some embodiments, when the robot 100 is in the docked position DP, the coils 164, 244 lie in substantially parallel planes. In some embodiments, the coil 164 defines a receiver coil plane PRC (FIG. 2), and the coil 244 defines a transmitter coil plane PTC, and the planes PRC and PTC are parallel or form an angle with respect to one another no greater than 10 degrees.

When the robot 100 is in the prescribed docked position DP (FIGS. 1 and 2), the coil 164 is located in a prescribed vertical alignment position with respect to the coil 244. In some embodiments, the central axis RCA of the coil 164 is substantially coaxial with the central axis TCA of the coil 244. In some embodiments, the axis RCA is disposed within 5 mm of the axis TCA in the receiver coil plane PRC and, in some embodiments, within 30 mm.

In other embodiments, when the robot 100 is in the docked position DP, the transmitter coil axis TCA intersects the receiver coil plane PRC at a location that is offset a prescribed offset distance from the receiver coil axis RCA, and the transmitter coil 244 vertically overlaps the receiver coil 164. In some embodiments, the prescribed distance is no greater than about 5 mm and, in some embodiments, is in the range of from about 5 mm to 30 mm.

Notably, the transmitter coil 244 is horizontally located in the platform 212 such that the transmitter coil center axis TCA is offset from the center or midline of the platform 212 in order to more closely align the center axes RCA, TCA of the receiver coil 164 and the transmitter coil 244 when the robot 100 is in the docked position DP.

The offset of the receiver coil 164 accommodates the evacuation port 318 of the dock 300.

Moreover, the placement of the receiver coil 164 in the undercarriage 115 of the robot 100 and the placement of the transmitter coil 244 in the platform 212 can provide a relatively small axial gap GC (FIG. 2) between the coils 164, 244. Nonetheless, the coils 164, 244 are each protected from the environment by being enveloped in the coil chambers 124, 216. A smaller gap enables improved energy transfer efficiency. In some embodiments, the gap GC has a height E10 of 7 mm or less.

According to some embodiments, the robot charging subsystem 160 and the dock charging subsystem 240 operate as follows. The dock charging circuit ("transmitter firmware") 242 assumes the following main states: Ping, Handshaking, and Charging. Generally, the dock charging circuit 242 "pings" periodically (e.g., approximately every ⅓ second) to determine whether the robot 100 is on the dock 200, confirms the presence of the robot 100, and determines whether to send a full charge.

In Ping mode, the dock charging circuit 242 starts the coil 244 oscillating, and measures how long it takes to stop oscillation to detect when a real robot is present, when there is a foreign object absorbing power ("snow shovel" detection), and when there is nothing near the dock.

In Handshake mode, the dock charging circuit 242 listens for an authentication word from the robot 100 by observing differences in power consumed when running power for a short duration.

In Charging mode, the power sent is controlled by the dock charging circuit 242 for efficiency and to keep the electronics in valid operating regions (current and voltage). In particular, in Charging mode the dock charging circuit 242 sends power using voltage-feedback-current-control until the dock charging circuit 242 detects the receiver (i.e., the robot charging circuit 162) detuning, and then stops sending power for a variable amount of time. The amount of time that power is off is dynamically adjusted based on how long the receiver consumed power before detuning.

Cycle-by-cycle control of the dock charging circuit 242 may be performed in an interrupt handler that runs on every cycle of the transmit coil (in some embodiments, approximately 200 KHz or every 5 μs). Every cycle the interrupt handler determines what current to send to the transmitter coil 244 on the next cycle by adjusting the current limit (called "limit" in the diagrams) or completely turning off adding energy the next cycle (called enabling the "dead" signal in the diagrams). The high level control code described determines which of these interrupt handlers should run to manage the transmitter coil 244 depending on the high level state of the dock charging circuit 242.

The "Charging Resonant Tank" state is the main mode when sending power to the robot 100. In this mode, the dock charging circuit 242 adjusts the current limit until the dock charging circuit 242 detects the robot charging circuit 162 detune. When it does, it enters the "Idle" state which triggers the background code to measure the amount of time the receiver coil 164 was drawing power and sleep for the calculated amount of time.

The "Hard Start" state and "Decaying" state are transient states while transferring power. The dock charging circuit 242 initially enters "Hard Start" state, and will move between "Charging Resonant Tank" state and "Decaying" state while transferring power until it enters "Idle" state when the robot charging circuit 162 detunes.

After starting and sending the authentication code, the robot charging circuit 162 checks that power is coming in. Assuming it is, the robot charging circuit 162 enters the main loop where it detunes when the system voltage exceeds some threshold. How long it takes for this to happen will depend on the power being drawn from the robot charging circuit 162 (i.e., whether it is charging a battery, and how much power is being sent to the battery). The robot charging circuit 162 then detunes briefly, which the dock charging circuit 242 will detect, and then retunes to accept power when the dock charging circuit 242 next decides to send it.

In some embodiments, the magnetic field emitted from the transmitter coil 244 and the tank circuit of the dock charging circuit 242 is also used in the navigation control of the robot 100. The robot 100 will detect the magnetic charge that accompanies the "ping" generated by the dock charging circuit 242. The robot 100 can use that detection to avoid the dock 200 (e.g., while the robot is moving about on its cleaning mission) or discover the dock 200 (to initiate docking). According to some embodiments, the detection radius is in the range of from about 6 to 18 inches from the dock 200 and, in some embodiments, 10 to 14 inches.

In some embodiments, the magnetic field sensor 155 on the robot 100 is used to detect the ping signals. The sensor 155 may be used to detect the ping signals independently of the robot's receiver coil 164 and charging circuit 162. The magnetic field sensor 155 may include a first magnetic sensing circuit 155A and a second magnetic sensing circuit 155B. The magnetic sensing circuits 155A, 155B may each be small LC circuits with high gain amplifiers. The inductor coil of the first magnetic sensing circuit 155A may be oriented in the Z-direction (vertically) so that it provides a signal roughly proportional to the distance to the transmitter coil 244. The inductor coil of the second magnetic sensing circuit 155B may be oriented in the X- or Y-direction (left-to-right, fore-aft, or horizontally) so that it provides a signal roughly proportional to the orientation to the transmitter coil 244.

The magnetic field sensor 155 may also be used to determine where the robot 100 is located in the magnetic field of the dock transmitter coil 244 during docking. In this manner, detection from the magnetic field sensor 155 can be used to execute the far approach step in place of or in addition to data provided by the front directional detector 156.

The magnetic field sensor 155 may also be used to confirm that the coils 164, 244 are sufficiently well-aligned once the robot 100 is fully docked. This can enable improved alignment between the coils 164, 244, and thereby guarantee good efficiency in the coupling to achieve good power transfer.

In some embodiments, the robot 100 is aligned with the dock 200, and thereby the coil 164 is aligned with the coil 244, along the X-axis and along the Y-axis with a tolerance of ±25 mm or less, in some embodiments, ±5 mm or less and, in some embodiments, about ±1 mm. In some embodiments, the tolerance for alignment of the coils 164, 244 along the Z-axis is 20 mm or less (i.e., the coil 164 is not spaced above the coil 244 more than 20 mm, and the coils 164, 244 are as close together as feasible).

Figure 13:
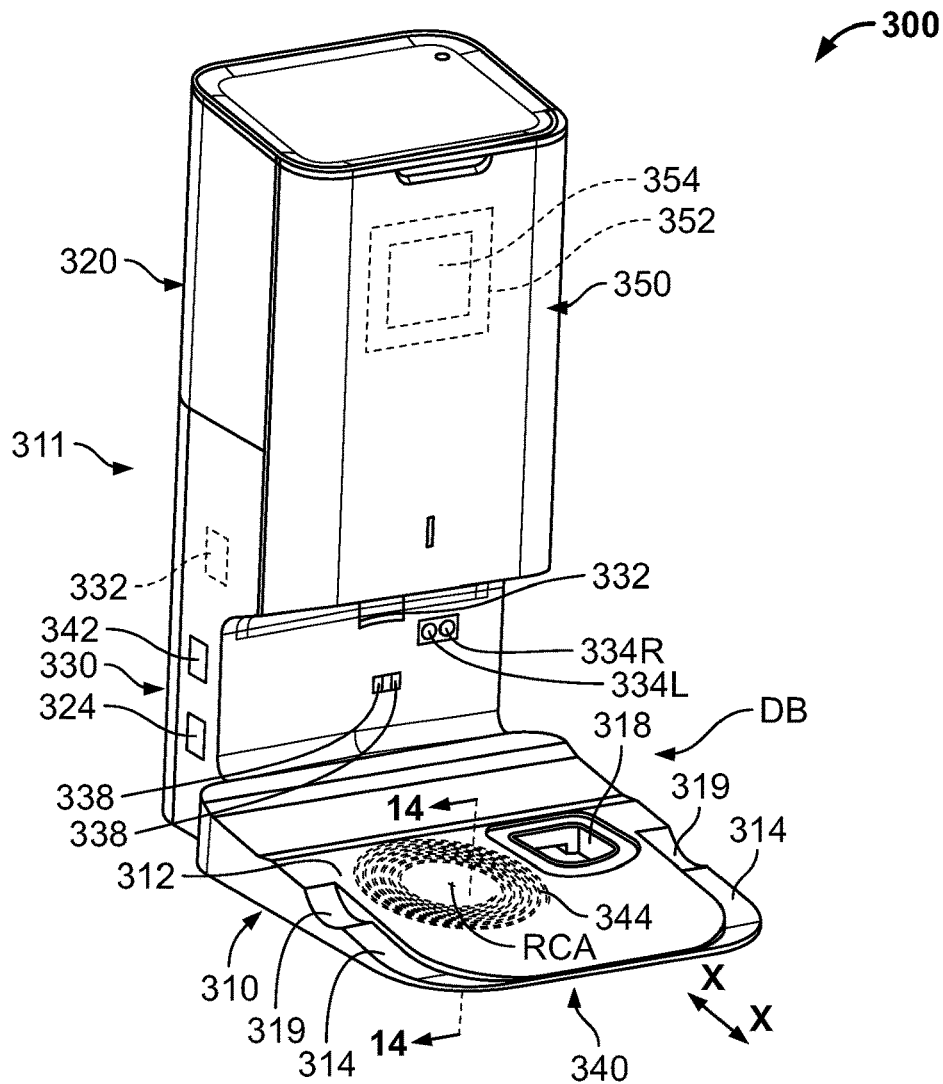
FIG. 13 is a front, top perspective view of an evacuation dock according to embodiments of the invention.
Figure 14:
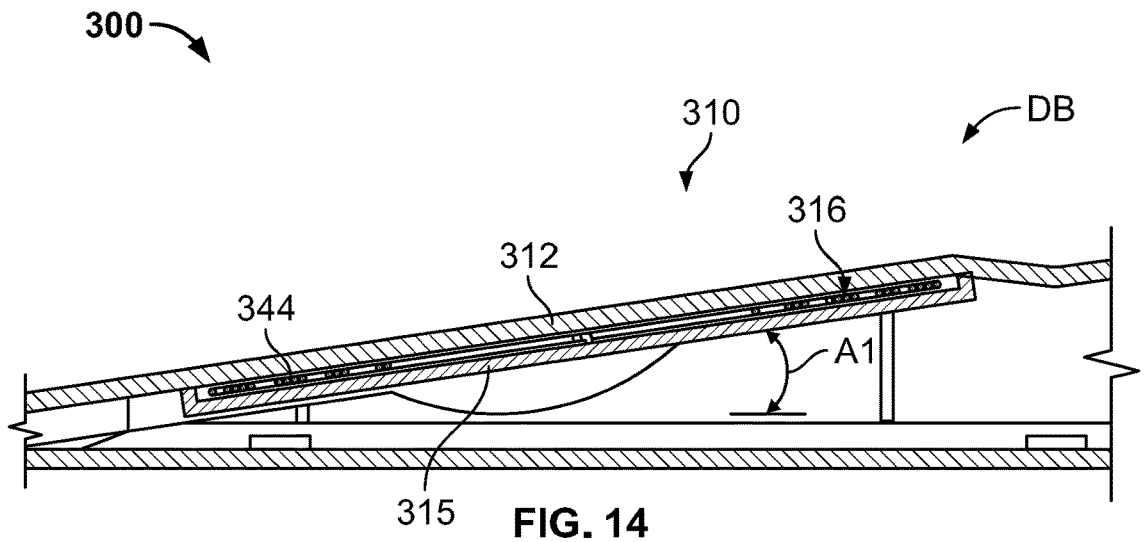
FIG. 14 is a fragmentary, cross-sectional view of the dock of FIG. 13 taken along the line 14-14 of FIG. 13.

FIGS. 13 and 14 show an evacuation dock 300 in accordance with one embodiment of the invention. The evacuation dock 300 includes a housing 311 including both a substantially horizontal base plate or platform 310 and a substantially vertical tower or backstop 320. A docking bay DB is defined over the platform 310 and in front of the backstop 320. The evacuation dock 300 may be any of a variety of shapes or sizes, providing sufficient space for the desired components and systems, described below.

The platform 310 includes a coil chamber 316 defined therein. The coil chamber 316 is defined by the wall 312 and a lower wall 315. A raised pad wall 312 overlies the coil chamber 316. Parallel tracks 314 are defined on either lateral side of the coil chamber 316 and the pad wall 312. An evacuation suction port 318 is defined in the pad wall 312. The evacuation suction port 318 is offset from the lateral centerline of the platform 310 and the midpoint between the tracks 314.

The platform 310 is sloped at an upwards angle toward the backstop 320. In some embodiments, the platform 310 angle of rise is in the range of from 6 to 10 degrees, in some embodiments, 8 to 10 degrees and, in some embodiments, about 8.6 degrees.

The evacuation dock 300 includes a charging subsystem 340, a communications/guidance system 330, a dock controller 322, and a power input connector 324 (connected to a power supply, not shown) corresponding to and operative in the same manner as the charging subsystem 240, the communications/guidance system 230, the dock controller 222, and the power input connector 224, respectively, except as discussed below. The evacuation dock 300 includes an avoidance emitter 332, directional emitters 334R, 334L, and a pair of fine alignment emitters 338 corresponding to the avoidance emitter 232, the directional emitters 234R, 234L, and the emitters 238, respectively.

The charging subsystem 340 includes a charging circuit 342 and a transmitter coil 344 corresponding to the charging circuit 242 and the transmitter coil 244. The coil 344 is encased in the coil chamber 316 in the same manner as described above with regard to the coil chamber 216 and the coil 244. The coil 344 is tilted or oriented at an oblique angle A1 (FIG. 14) with respect to the floor toward the backstop 320. In some embodiments, the angle A1 is in the range of from about 6 to 10 degrees, in some embodiments, 8 to 10 degrees and, in some embodiments, about 8.6 degrees. The central axis RCA of the coil 344 is offset from the midline X-X of the platform 310 to match the offset of the coil 164.

The evacuation dock 300 further includes a debris evacuation system 350. The evacuation system 350 includes a debris bin 352 (which may be removable) in the tower 320, an evacuation port 318 located in the platform 310, a duct or ducts fluidly connecting the port 318 to the bin 352, and a suction fan 354 configured to draw debris from the evacuation port 318 and into the bin 352.

The wheel tracks 314 are designed to receive the robot's drive wheels 132 to guide the robot 100 onto the platform 310 in proper alignment with the evacuation suction port 318. Each of the wheel tracks 314 includes a depressed wheel well 319 that holds a drive wheel 132 in place to positively align and locate the robot 100 relative to the platform 310, and to prevent the robot 100 from unintentionally sliding down the inclined platform 310 once docked.

The robot 100 can dock with the evacuation dock 300 by advancing onto the platform 310 and into the docking bay DB of the evacuation station 300 as described above with regard to the dock 200. Once the evacuation dock 300 receives the robot 100, the suction fan 354 generates a vacuum that draws debris from the cleaning bin 145 of the robot 100, through the platform 310, and into the debris bin 352.

When the robot 100 is docked in the prescribed docked position in the docking bay DB, the coils 164 will be superimposed over and suitably vertically aligned with the coil 344. Additionally, the evacuation port 120 of the robot 100 will be aligned with and in contact with or in close proximity to the evacuation port 318 of the evacuation dock 300.

The robot 100 can avoid, discover, far approach, near approach, and fine approach the evacuation dock 300 in the same manner as described above with regard to the dock 200. It is also contemplated that the fine alignment emitters 338 may be omitted. The robot may rely on the wheel wells 319 to capture the wheels 132, thereby positively aligning and positioning the robots and ensuring that the robot is properly aligned in the final portion of the docking approach. The image sensor device 158 can be used to ensure that the wheels 132 do not over- or under-run the wheel wells.

The magnetic field sensor 155 may also be used to detect magnetic ping signals from the coil 344 to guide the robot 100 as described above for the dock 200.

In some embodiments, the robot 100 is aligned with the evacuation dock 300, and the coil 164 is thereby aligned with the coil 344, along the X-axis and along the Y-axis with a tolerance of about ±1 mm. The evacuation dock 300 requires close alignment of the evacuation port 120 of the robot with the suction port 318 of the evacuation dock 300, and therefore the tolerance for misalignment may be very small and less than the tolerance permitted for the dock 200. In some embodiments, the tolerance for alignment of the coils 164, 344 along the Z-axis is about ±1-20 mm.

Figure 15:
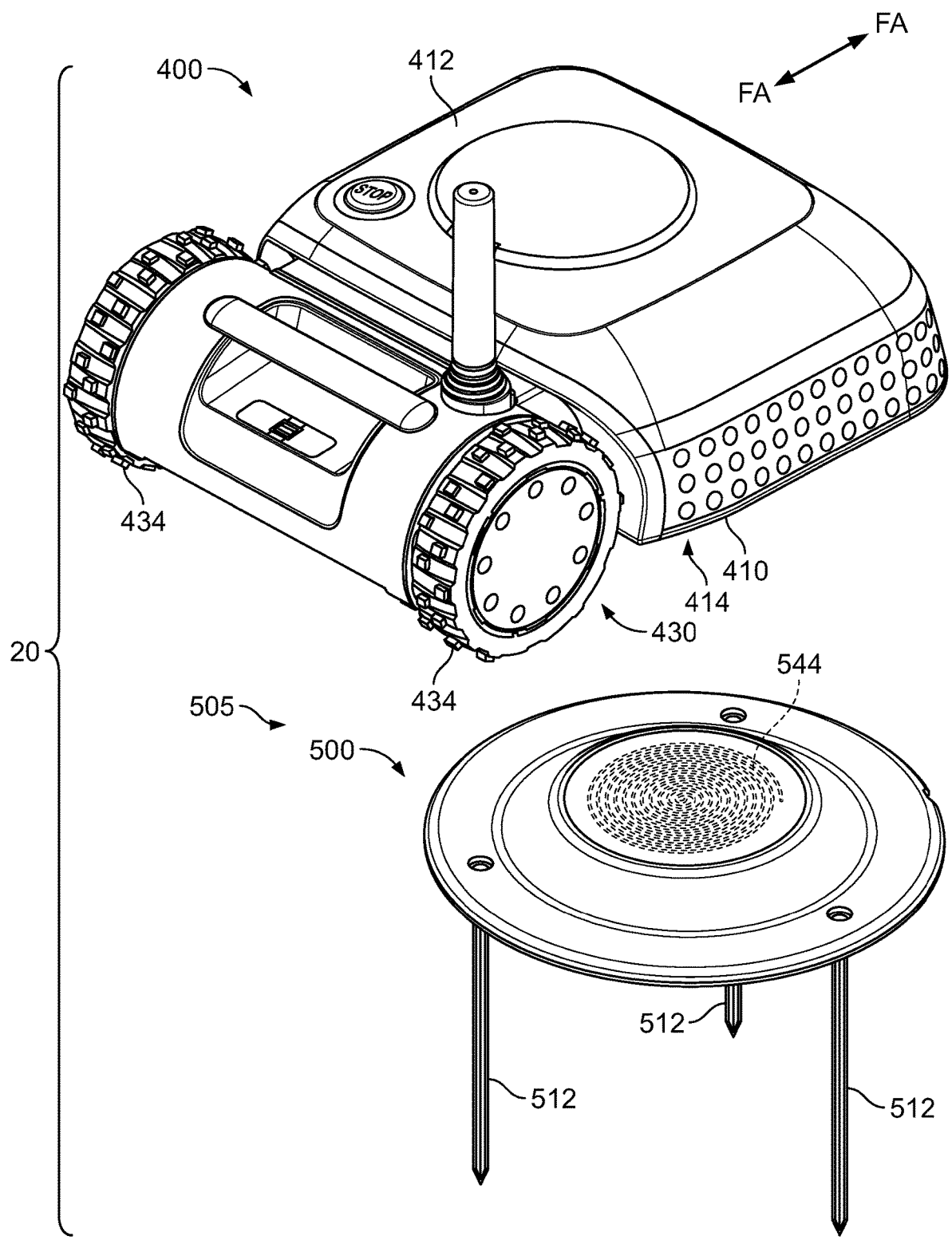
FIG. 15 is an exploded, top perspective view of an autonomous lawn mowing robot system according to embodiments of the invention.
Figure 16:
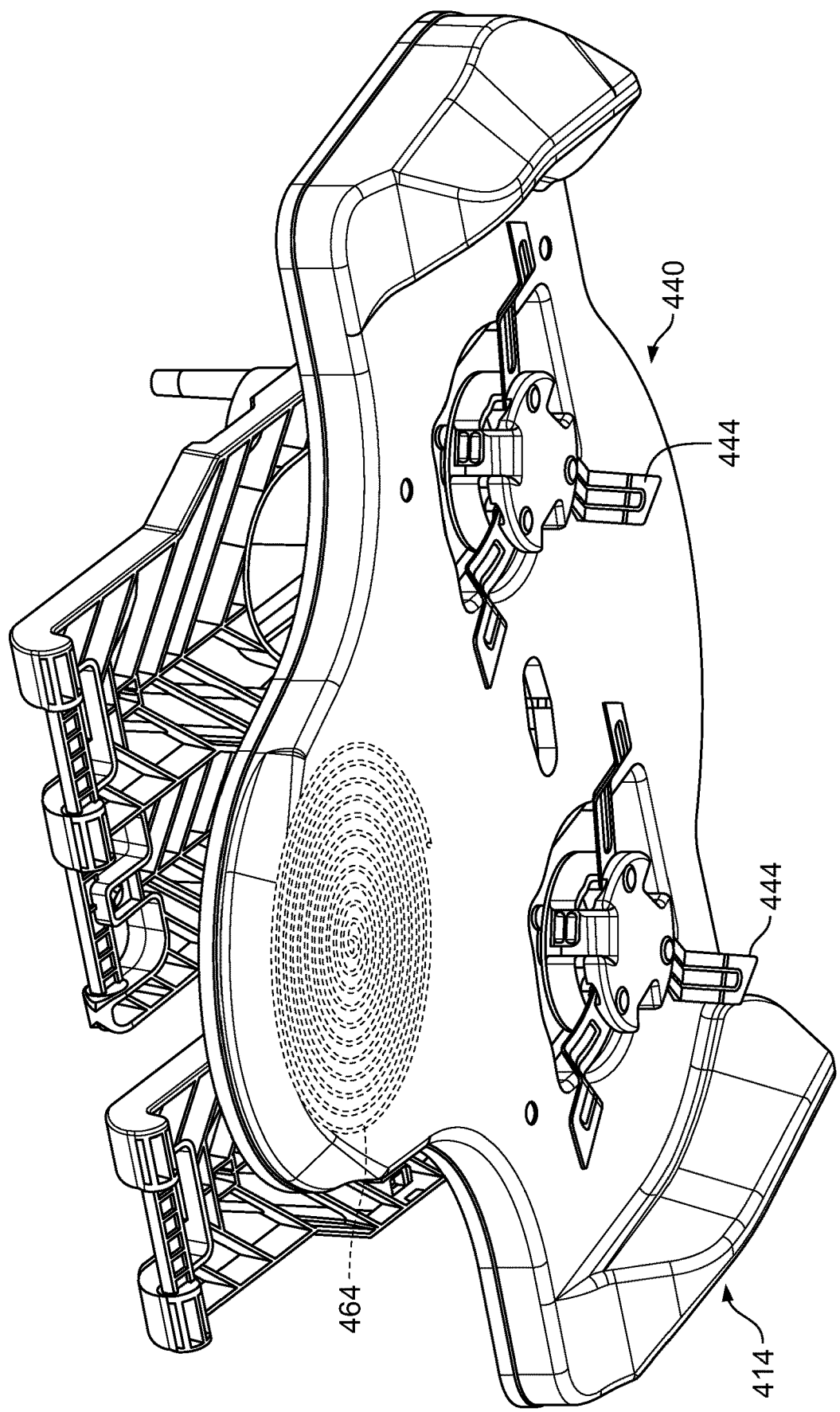
FIG. 16 is a fragmentary, bottom view of a lawn mowing robot forming a part of the robot system of FIG. 15.
Figure 17:
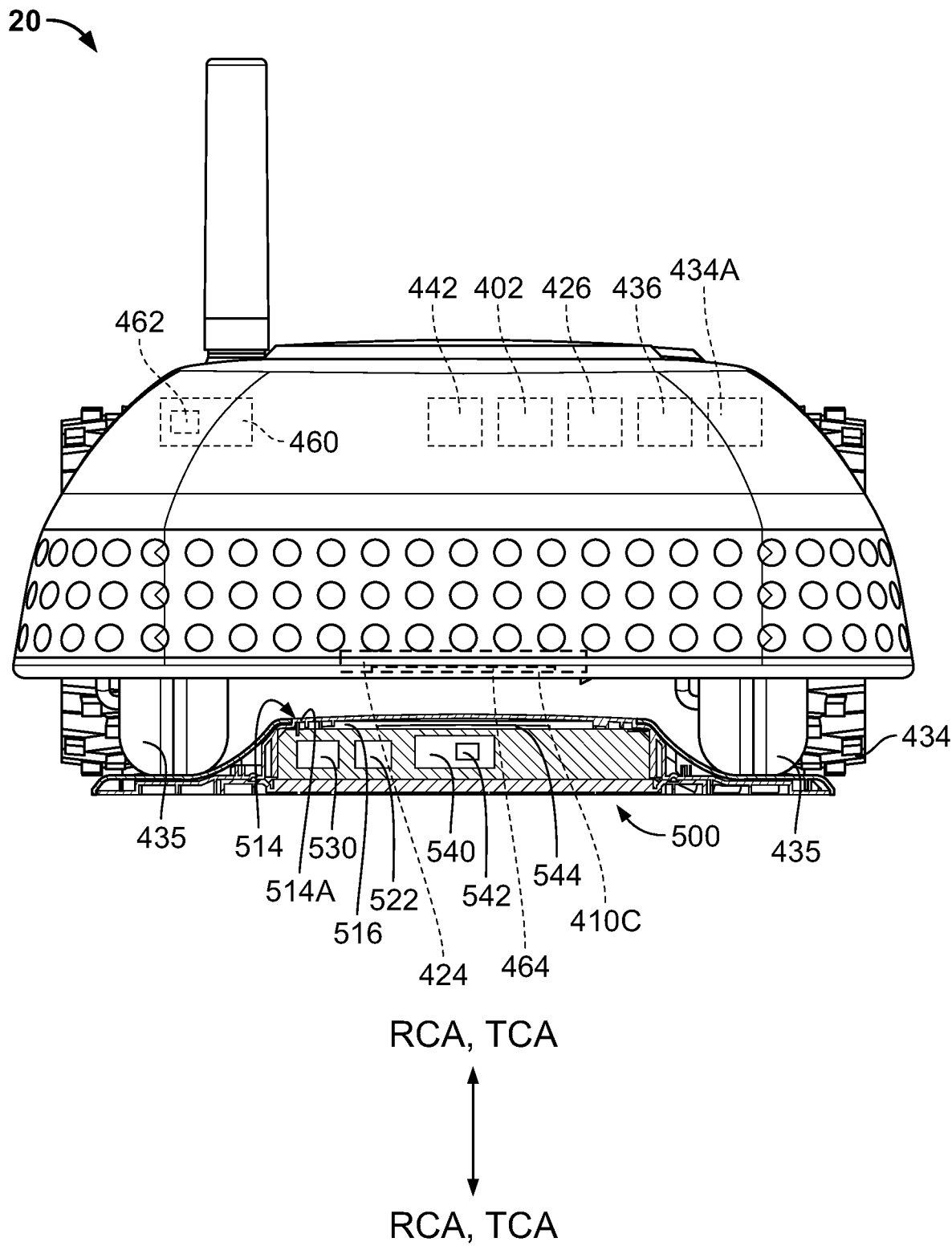
FIG. 17 is a front view of the lawn mowing robot system of FIG. 15 wherein the lawn mowing robot is positioned over a dock of the lawn mowing robot system for charging of the lawn mowing robot.

With reference to FIGS. 15-17, a lawn mowing robot system 20 according to embodiments of the invention is shown therein. The system 20 includes a lawn mower robot and a charging dock 500. The robot 400 includes a robot charging subsystem 460 and the dock 500 includes a dock charging subsystem 560, which together form an induction charging system 505.

The robot 400 further includes a robot controller 402, a chassis 410, a cutting deck 414, a cover 412, a battery 426, a motive system 430, and a cutting system 440. The chassis 410, the cutting deck 414, and the cover 412 form a robot body, housing infrastructure or housing.

The motive system 430 includes a pair of independently driven wheels 434, a pair of caster wheels 435, a motor 434A to drive the wheels 434, and an automatic height adjuster 436.

The cutting system 440 includes at least one cutting element suspected from the bottom of the body of the robot 100. As shown, the cutting system 440 includes a pair of rotary cutting blades 444 suspended from the bottom of the cutting deck 414 and an electric motor 442 to drive the blades 444.

The robot charging subsystem 460 includes a charging circuit 462 and a receiver coil 464 generally corresponding to the charging circuit 162 and a receiver coil 164.

The coil 464 is contained in a receiver coil chamber 424 defined in the cutting deck 414. The cutting deck 414 or chassis 410 includes a bottom wall 410C defining a portion of the receiver coil chamber 424. In some embodiments, the bottom wall 410C has a nominal thickness of at least 2 mm. The bottom wall 410C separates the coil 464 from the underlying surface (e.g., the ground or objects). In some embodiments, the center axis RCA-RCA is centered on the fore-aft central axis FA-FA of the robot 400.

The dock 500 includes a housing 511, ground anchors or spikes 512, the dock charging subsystem 540, a homing system 530, and a dock controller 522.

The housing 511 includes a base 510 and a cover 514. The base 510 and the cover 514 collectively form an enclosed chamber 516.

The dock charging subsystem 540 includes a charging circuit 542 and a transmitter coil 544 generally corresponding to the charging circuit 242 and a transmitter coil 244. The transmitter coil 544 is contained in the chamber 516. The cover 514 includes a top wall 514A defining a portion of the chamber 516. The top wall 514A separates the coil 544 from the robot 400 or other overlying objects. In some embodiments, the top wall 514A has a nominal thickness of at least 2 mm.

The robot 400 can be used to autonomously mow a lawn. When the robot 400 has completed its mowing session or requires a recharge, it will seek the dock 500.

In some embodiments, the robot 400 uses localization beacons about the lawn to triangulate into the vicinity of the dock 500. In some embodiments, the robot 400 is configured to align with the dock 500 using the magnetic charge emitted by a periodic pinging of the dock charging circuit 542, such as described above with regard to the magnetic field sensor 155 and the dock charging circuit 242. In some embodiments, the robot 400 includes a Hall Effect sensor which is used to sense the magnetic charge ping, enabling the robot controller 402 to align the robot 400 with the dock 500 as the robot 400 approaches its prescribed docked position over the dock 500.

When the robot 400 is in its prescribed docked position over the dock 500, the receiver coil 464 and the transmitter coil 544 will be substantially vertically aligned, overlapping or in near proximity. In some embodiments, the robot 400 is positioned over the dock 500 such that the central axis RCA-RCA of the receiver coil 464 is aligned or brought into close proximity to the central axis TCA-TCA of the transmitter coil 544. The robot 400 may lower the cutting deck 414 relative to the chassis 510 and the wheels 435, and thereby the coil 464, using the height adjuster 436. In this manner, the receiver coil 464 is brought into closer proximity to the transmitter coil 544. In some embodiments, the cutting deck 414 is lowered into contact with the dock 500.

The robot charging subsystem 460 and the dock charging subsystem 540 can thereafter cooperate to inductively charge the robot 400 in the same manner as described above with regard to the robot charging subsystem 160 and the dock charging subsystem 240.

The coils 164, 244, 344, 464, 544 may be formed of any suitable material and construction. In some embodiments, one or more of the coils is/are formed of wound copper wire. In some embodiments, one or more of the coils is/are formed of stamped copper. In some embodiments, one or more of the coils is/are formed of wound aluminum wire. In some embodiments, one or more of the coils is/are formed of wound Litz wire (copper or aluminum).

In some embodiments, the vertical spacing distance between the coils 164 and 244 and between the coils 164 and 344 when the robot is docked us less than 20 mm.

In some embodiments, the coil 164 is 1.25 mm thick, has 22 windings, an inner diameter of 58 mm, and an outer diameter of 117 mm.

In some embodiments, the receiver coil 164 ("Rx Coil") and the transmitter coils 244, 344 ("Tx Coil") have the following characteristics:
Tx Coil (Dock/Evacuation Station)
OD: 110-120 mm
12-15 turns
Induction of 30 microhenries
The front runner embodiment is a Litz Wire coil.
Rx Coil (Robot)
OD: 110-120 mm, currently ~114 mm
18-26 turns, currently 22 turns
Induction of 30-65 uH, currently 50 microhenries
The front runner embodiment is copper magnet wire coil.
Representative measured data for Copper Magnetic Coil:

| Magnet Coil 1: 22 Turns | Resistance | Inductance: |
|---|---|---|
| 0 Hz: | 150.323 mΩ | 47.217 uH |
| 100 kHz: | 650.055 mΩ | 46.538 uH |
| 200 kHz: | 1.359 Ω | 46.208 uH |
| 300 kHz: | 2.271 Ω | 46.038 uH |
| Magnet Coil 3: 23 Turns | Resistance | Inductance: |
| 0 Hz: | 161.146 mΩ | 56.777 uH |
| 100 kHz: | 798.030 mΩ | 55.819 uH |
| 200 kHz: | 1.630 Ω | 55.398 uH |
| 300 kHz: | 2.640 Ω | 55.183 uH |

Litz wire coils are also contemplated, with representative measured data as follows:

| Litz Wire Coil 1: 23 Turns | Resistance | Inductance: |
|---|---|---|
| 0 Hz: | 234.934 mΩ | 61.536 uH |
| 100 kHz: | 683.445 mΩ | 60.350 uH |
| 200 kHz: | 1.575 Ω | 60.168 uH |
| 300 kHz: | 2.912 Ω | 60.060 uH |
| Litz Wire Coil 2: 23 Turns | Resistance | Inductance: |
| 0 Hz: | 163.450 mΩ | 58.556 uH |
| 100 kHz: | 376.530 mΩ | 58.358 uH |
| 200 kHz: | 907.549 mΩ | 58.278 uH |
| 300 kHz: | 1.736 Ω | 58.220 uH |

Stamped copper coils are also contemplated, with representative measured data as follows:

| Stamped Copper Coil 60 uH: | Resistance | Inductance: |
|---|---|---|
| 0 Hz: | 426.396 mΩ | 60.527 uH |
| 100 kHz: | 1.100 Ω | 59.789 uH |
| 200 kHz: | 2.145 Ω | 59.622 uH |
| 300 kHz: | 3.452 Ω | 59.891 uH |
| Stamped Copper Coil 32 uH: | Resistance | Inductance: |
| 0 Hz: | 293.873 mΩ | 33.672 uH |
| 100 kHz: | 627.671 mΩ | 33.191 uH |
| 200 kHz: | 1.117 Ω | 33.024 uH |
| 300 kHz: | 1.743 Ω | 32.981 uH |

Stamped aluminum coils are also contemplated, with representative measured data as follows:

| Stamped Aluminum Coil 60 uH 0.4 mm: | Resistance | Inductance: |
|---|---|---|
| 0 Hz: | 537.804 mΩ | 60.448 uH |
| 100 kHz: | 1.194 Ω | 59.494 uH |
| 200 kHz: | 2.424 Ω | 59.829 uH |
| 300 kHz: | 3.936 Ω | 60.130 uH |
| Stamped Aluminum Coil 60 uH 0.3 mm: | Resistance | Inductance: |
| 0 Hz: | 559.495 mΩ | 60.596 uH |
| 100 kHz: | 1.211 Ω | 60.098 uH |
| 200 kHz: | 2.370 Ω | 59.940 uH |
| 300 kHz: | 3.790 Ω | 60.229 uH |
| Stamped Aluminum Coil 32 uH 0.3 mm | Resistance | Inductance: |
| 0 Hz: | 369.833 mΩ | 33.720 uH |
| 100 kHz: | 669.292 mΩ | 33.488 uH |
| 200 kHz: | 1.217 Ω | 33.342 uH |
| 300 kHz: | 1.910 Ω | 33.326 uH |

In some embodiments, the receiver coil 164 ("Rx Coil") and the transmitter coils 244, 344 ("Tx Coil") are stamped aluminum coils having the following characteristics:
Rx Coil:
Outer Diameter: 114 mm
Inner Diameter: 30 mm
Turns: 30
Trace Width: 1.2 mm
Space between traces: 0.2 mm
Estimated inductance: 58 uH (microhenries)
Tx Coil:
Outer Diameter: 114 mm
Inner Diameter: 72 mm
Turns: 15
Trace Width: 1.2 mm
Space between traces: 0.2 mm
Estimated inductance: 32 uH (microhenries)
In some embodiments, the receiver coil 464 ("Rx Coil") and the transmitter coil 544 ("Tx Coil") of the robotic lawn mower system 20 have the following characteristics:
Tx Coil (Charging Dock)
4 turns Induction of 10-20 uH, currently 15 microhenries
Need to charge 300 W battery
Rx Coil (Robot)
9 turns
16 AWG (American wire gauge)
Nominal diam 300 mm
Induction of 40-60 uH, currently 50 microhenries
(Data measured on 8 turns of #18 AWG: 100 kHz frequency, 56.uH, 0.499 ESR)

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. An autonomous mobile floor cleaning robot for cleaning a surface, the robot comprising:
   a housing having a bottom;
   a motive system operative to propel the robot across the surface;
   an induction charging system including a receiver coil in the housing proximate the bottom of the housing, the receiver coil being configured to be inductively coupled to a transmitter coil in a charging dock to charge the robot via electromagnetic induction, the receiver coil including at least one concentrically spirally wound planar wire at least partially proximate a lateral side of the housing; and
   a cleaning system operative to clean the surface as the robot traverses the surface, the cleaning system including an evacuation port located in the bottom of the housing to release debris from the robot, wherein the evacuation port is laterally outside an outer diameter of the receiver coil.

2. The robot of claim 1 wherein the receiver coil is offset from the center of the robot.

3. An autonomous mobile robot, comprising:
   a housing having a bottom;
   a motive system operative to propel the robot across a surface;
   an induction charging system including a receiver coil in the housing proximate the bottom of the housing, the receiver coil including at least one concentrically spirally wound planar wire at least partially proximate a lateral side of the housing and configured to enable inductive charging; and
   an evacuation port located in the bottom of the housing and laterally outside an outer diameter of the receiver coil;
   wherein the housing includes a bottom wall separating the receiver coil from the surface.

4. The robot of claim 3 further including a cleaning system operative t surface as the robot traverses the surface.

5. The robot of claim 4 wherein the receiver coil is sealed from the environment and the cleaning system by the housing.

6. The robot of claim 3 further including a cutting element suspended from the bottom of the housing.

7. The robot of claim 3 wherein:
   the housing defines a coil chamber configured to receive the receiver coil, the coil chamber positioned at the bottom of the housing; and
   the receiver coil is disposed in the coil chamber.

8. The robot of claim 7, wherein the coil chamber holds the receiver coil horizontal above the surface.

9. The robot of claim 7, wherein:
   a nominal thickness of the portion of the bottom wall defining the coil chamber is at least 2 mm; and
   a nominal thickness of a top wall defining the coil chamber is at least 2 mm.

10. The robot of claim 7 wherein:
    the housing includes a chassis and a bottom cover;
    the chassis includes a chassis bottom wall covering the receiver coil and separating the receiver coil from a compartment of the robot; and
    the bottom cover separates the receiver coil from the surface.

11. The robot of claim 3, wherein a center axis of the receiver coil is horizontally offset from a lateral centerline extending between front and rear edges of the robot by an offset distance.

12. The robot of claim 11, wherein the offset distance is in the range of from about 2 cm to 8 cm.

13. The robot of claim 3, further comprising a debris bin disposed at least partially above the receiver coil.

14. The robot of claim 3, wherein the evacuation port is located in the bottom of the housing at a position horizontally offset from a lateral centerline extending between the front and rear edges of the robot and located adjacent the coil.

15. The robot of claim 3, wherein the front of the robot defines a square profile.

16. The robot of claim 3, wherein the receiver coil is located a vertical distance from a lower outer surface of the bottom wall in the range of from about 1 mm to 5 mm.

17. The robot of claim 16, wherein the receiver coil is located a vertical distance from a lower outer surface of the bottom wall of less than about 3 mm.

18. The robot of claim 3, wherein windings of the receiver coil are mechanically fixed to an inside of a top surface of the bottom wall.

19. The robot of claim 3, wherein the receiver coil is affixed to an inside top surface of the bottom wall by adhesive or fasteners.

20. The robot of claim 3, wherein the receiver coil is molded into the bottom wall or a top wall of the housing overlying the receiver coil.

21. The robot of claim 3, wherein the receiver coil is encased by plastic on both its top and bottom sides.

22. The robot of claim 3, wherein the at least one planar wire is concentrically spirally wound to form radially superimposed segments or turns.

* * * * *

UNITED STATES PATENT AND TRADEMARK OFFICE
CERTIFICATE OF CORRECTION

PATENT NO. : 10,575,696 B2
APPLICATION NO. : 15/647677
DATED : March 3, 2020
INVENTOR(S) : O'Brien et al.

Page 1 of 1

It is certified that error appears in the above-identified patent and that said Letters Patent is hereby corrected as shown below:

In the Claims

In Column 27, Line 62, in Claim 4, delete "t" and insert --to clean the-- therefor In Column 28, Line 19, in Claim 10, delete "claim 7" and insert --claim 3-- therefor Signed and Sealed this
Eighth Day of December, 2020

Andrei Iancu
*Director of the United States Patent and Trademark Office*